US011915206B2

(12) United States Patent
Merg et al.

(10) Patent No.: US 11,915,206 B2
(45) Date of Patent: Feb. 27, 2024

(54) METHODS AND SYSTEMS FOR CLUSTERING OF REPAIR ORDERS BASED ON INFERENCES GATHERED FROM REPAIR ORDERS

(71) Applicant: Snap-on Incorporated, Kenosha, WI (US)

(72) Inventors: Patrick S. Merg, Hollister, CA (US); Jacob G. Foreman, Hollister, CA (US); Bradley R. Lewis, Gilroy, CA (US); Brett A. Kelley, San Jose, CA (US)

(73) Assignee: Snap-on Incorporated, Kenosha, WI (US)

( * ) Notice: Subject to any disclaimer, the term of this patent is extended or adjusted under 35 U.S.C. 154(b) by 4 days.

(21) Appl. No.: 18/045,336

(22) Filed: Oct. 10, 2022

(65) Prior Publication Data

US 2023/0068169 A1 Mar. 2, 2023

Related U.S. Application Data

(63) Continuation of application No. 16/160,100, filed on Oct. 15, 2018, now Pat. No. 11,521,182, which is a (Continued)

(51) Int. Cl.

*G06Q 10/20* (2023.01)
*G06F 16/28* (2019.01)
*G07C 5/00* (2006.01)

(52) U.S. Cl.

CPC ........... *G06Q 10/20* (2013.01); *G06F 16/285* (2019.01); *G07C 5/00* (2013.01)

(58) Field of Classification Search

CPC .......... G06Q 10/20; G06F 16/285; G07C 5/00
See application file for complete search history.

(56) References Cited

U.S. PATENT DOCUMENTS 6,301,531 B1 10/2001 Pierro et al.
7,904,219 B1 3/2011 Lowrey
(Continued)

FOREIGN PATENT DOCUMENTS

CN 104937592 A 9/2015
WO 2015/035056 A2 3/2015

OTHER PUBLICATIONS

International Search Report for corresponding PCT Application No. PCT/US2016/060373, dated Feb. 6, 2017.
(Continued)

*Primary Examiner* — Albert M Phillips, III
*Assistant Examiner* — Courtney Harmon
(74) *Attorney, Agent, or Firm* — McDonnell Boehnen Hulbert & Berghoff LLP

(57) ABSTRACT

A processor may determine that a particular computer-readable vehicle repair order (RO) (e.g., including first and second RO portions) corresponds to an existing cluster of ROs due to the particular RO including RO data that refers to a particular vehicle symptom. The processor may determine that the first RO portion includes first data representative of a non-specific vehicle component and may then responsively also determine that the second RO portion includes second data that the at least one processor can use to determine a specific vehicle component associated with the particular RO. Responsively, the processor may determine the specific vehicle component based on the first and second data and may then add the particular RO to a different cluster of ROs that is arranged to contain ROs that correspond to the particular vehicle symptom and to the specific vehicle component.

20 Claims, 8 Drawing Sheets

Related U.S. Application Data continuation of application No. 14/933,337, filed on Nov. 5, 2015, now Pat. No. 10,134,013.

(56) References Cited

U.S. PATENT DOCUMENTS

| | | | | |
|---|---|---|---|---|
| 7,945,438 | B2 | 5/2011 | Balmelli et al. | |
| 9,201,930 | B1 | 12/2015 | Merg | |
| 10,157,347 | B1 * | 12/2018 | Kasturi | G06F 16/3326 |
| 2002/0007289 | A1 | 1/2002 | Malin et al. | |
| 2003/0055812 | A1 | 3/2003 | Williams | |
| 2008/0243488 | A1 | 10/2008 | Balmelli et al. | |
| 2010/0023203 | A1 | 1/2010 | Shibi | |
| 2012/0011073 | A1 * | 1/2012 | Rajpathak | G06Q 10/20 705/305 |
| 2012/0116630 | A1 * | 5/2012 | Howell | G06Q 10/0639 701/31.9 |
| 2015/0046391 | A1 | 2/2015 | Merg | |
| 2016/0036899 | A1 | 2/2016 | Moody | |
| 2019/0050825 | A1 | 2/2019 | Merg et al. | |
| 2019/0050826 | A1 | 2/2019 | Merg et al. | |

OTHER PUBLICATIONS

Campi et al., "Chapter IV—Search Engine: Approaches and Performance", Semantic Knowledge management: An Ontology-based Framework (2008).

Wikipedia, "Text Mining", Internet Article dated Nov. 3, 2015, https://en.wikipedia.org/w/index.php?title=Text_mining&oldid=688928444 (retrieved Jan. 25, 2017).

Guang et al., "Data-driven fault diagnosis for an automobile suspension system by using a clustering based method", Journal of the Franklin Institute, 351(6):3231-3244 (2014).

Owen et al., "Manhout in Action", Manning Publications, vol. 59 (2011).

* cited by examiner

RTR Car Repair, Tuscaloosa, Alabama    February 18, 2009

Customer: C. N. Saban    VIN: 1GYSP74WXVR123456
Vehicle: 1997 Ford Crown Vic. 4.6L, V8, (W), Auto Trans.
Complaint: Failed emissions test. Check engine light on. Change oil and filter.

Service procedure:

| | Time | Rate | Cost | Part Description | Part # | Price |
|---|---|---|---|---|---|---|
| Check DTC – P0171 and P0174. (C45) | 0.3 | $100 | $30 | MAF sensor | 6012980 | $89.99 |
| Check starter/ignition system. (C152) Check system vacuum and fuel pressures 30/40 PSI. (C117, C245) MAF readings bad. (C772) | 0.5 | $100 | $50 | Clutch | 6043011 | $19.99 |
| Cleaned MAF, retested, recalibrated MAF. Verify repair. (C415, R550) | 1.0 | $100 | $100 | Sensor | 6563772 | $73.99 |
| | 0.2 | $100 | $20 | Sub-total | | $183.97 |
| Change engine oil and filter. (C085) | 0.5 | $50 | $25 | Labor | | $335.00 |
| Replace clutch. (C101) | 0.2 | $50 | $10 | Tax | | $51.90 |
| Check DTC. Diagnose DTC 117. (C100) | 0.4 | $100 | $40 | Total | | $570.87 |
| Coolant sensor short. R/R coolant sensor. (R199). | 0.4 | $100 | $40 | | | |
| Verify repair. (V18) | 0.2 | $100 | $20 | | | |

Mileage: 23,411

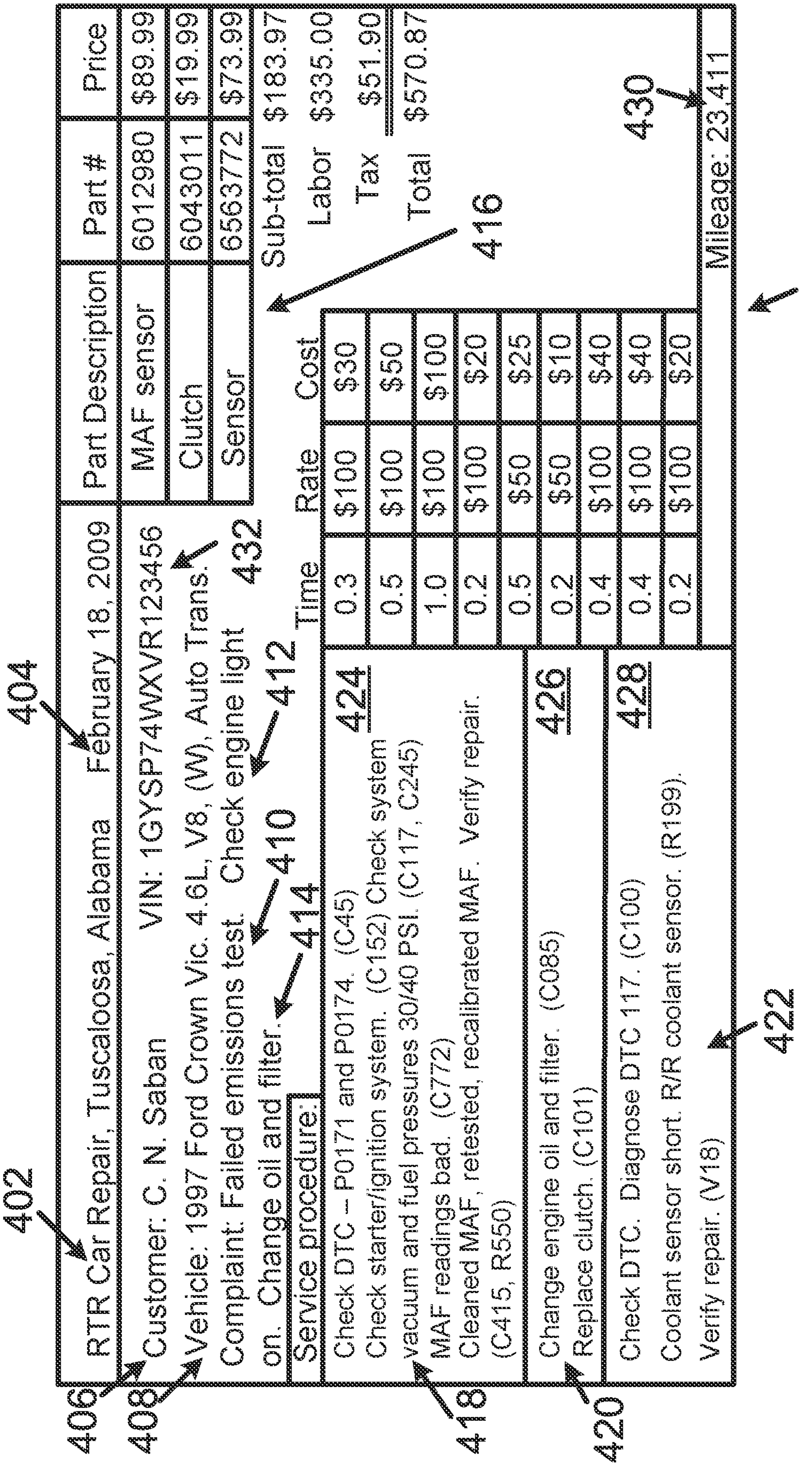

RO ID: 3915 Repair year 2009 Y/M/M/E: 1997/Ford/Crown Victoria/4.6L, V8, VIN (W)

Work Requested: Customer states the vehicle has failed state emissions certification. Please diagnose and advise. Customer states please replace the MAF sensor. 508

Work Performed: Technician scan tested and verified the DTC P0171 and DTC P0174. Tested for vacuum leaks and found none at the time. Tested the fuel pump pressure found [[30]] PSI and [[40]] PSI unregulated. Checked the scan data. Found the MAF sensor readings incorrectly. Removed the MAF sensor and cleaned. Found the MAF sensor is not damaged. Recommend recalibration of MAF sensor. Recalibrated MAF sensor. Found the MAF sensor readings correctly. 510

Meta-data: Customer complaint: failed state emissions certification
Pcode: P0171, P0174
Component: mass airflow sensor (MAF) (MAF sensor) 512

Usage indicator: Distance = 23,411 miles 514

FIG. 5

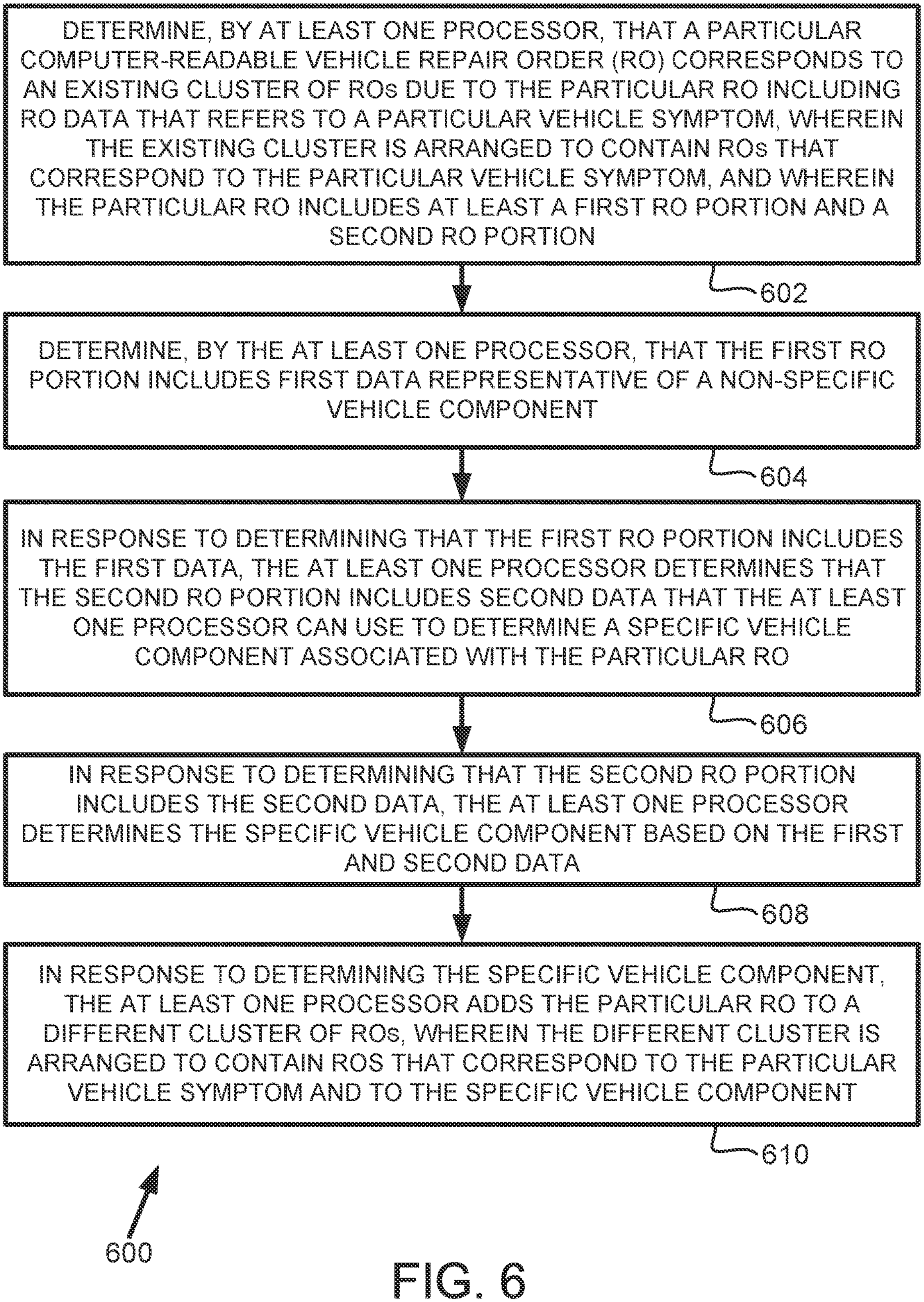

FIG. 6

```
┌─────────────────────────────────────────────────────────────┐
│  DETERMINE, BY AT LEAST ONE PROCESSOR, THAT A PARTICULAR    │
│  COMPUTER-READABLE VEHICLE REPAIR ORDER (RO) CORRESPONDS TO │
│  AN EXISTING CLUSTER OF ROs DUE TO THE PARTICULAR RO        │
│  INCLUDING RO DATA THAT REFERS TO A PARTICULAR VEHICLE      │
│  SYMPTOM, WHEREIN THE EXISTING CLUSTER IS ARRANGED TO       │
│  CONTAIN ROs THAT CORRESPOND TO THE PARTICULAR VEHICLE      │
│  SYMPTOM, AND WHEREIN THE PARTICULAR RO INCLUDES AT LEAST   │
│  A FIRST RO PORTION AND A SECOND RO PORTION                 │
└─────────────────────────────────────────────────────────────┘
                              │
                              ▼  ⎯602
┌─────────────────────────────────────────────────────────────┐
│  DETERMINE, BY THE AT LEAST ONE PROCESSOR, THAT THE FIRST RO│
│  PORTION INCLUDES FIRST DATA REPRESENTATIVE OF A            │
│  NON-SPECIFIC VEHICLE COMPONENT                             │
└─────────────────────────────────────────────────────────────┘
                              │
                              ▼  ⎯604
┌─────────────────────────────────────────────────────────────┐
│  IN RESPONSE TO DETERMINING THAT THE FIRST RO PORTION       │
│  INCLUDES THE FIRST DATA, THE AT LEAST ONE PROCESSOR        │
│  DETERMINES THAT THE SECOND RO PORTION INCLUDES SECOND DATA │
│  THAT THE AT LEAST ONE PROCESSOR CAN USE TO DETERMINE A     │
│  SPECIFIC VEHICLE COMPONENT ASSOCIATED WITH THE PARTICULAR RO│
└─────────────────────────────────────────────────────────────┘
                              │
                              ▼  ⎯606
┌─────────────────────────────────────────────────────────────┐
│  IN RESPONSE TO DETERMINING THAT THE SECOND RO PORTION      │
│  INCLUDES THE SECOND DATA, THE AT LEAST ONE PROCESSOR       │
│  DETERMINES THE SPECIFIC VEHICLE COMPONENT BASED ON THE     │
│  FIRST AND SECOND DATA                                      │
└─────────────────────────────────────────────────────────────┘
                              │
                              ▼  ⎯608
┌─────────────────────────────────────────────────────────────┐
│  IN RESPONSE TO DETERMINING THE SPECIFIC VEHICLE COMPONENT, │
│  THE AT LEAST ONE PROCESSOR ADDS THE PARTICULAR RO TO A     │
│  DIFFERENT CLUSTER OF ROs, WHEREIN THE DIFFERENT CLUSTER IS │
│  ARRANGED TO CONTAIN ROS THAT CORRESPOND TO THE PARTICULAR  │
│  VEHICLE SYMPTOM AND TO THE SPECIFIC VEHICLE COMPONENT      │
└─────────────────────────────────────────────────────────────┘
                                                      ⎯610
              600

```

METHODS AND SYSTEMS FOR CLUSTERING OF REPAIR ORDERS BASED ON INFERENCES GATHERED FROM REPAIR ORDERS

CROSS-REFERENCE TO RELATED APPLICATION

This application is a continuation application of U.S. patent application Ser. No. 16/160,100.

U.S. patent application Ser. No. 16/160,100 was filed on Oct. 15, 2018 and is entitled "Methods and systems for clustering of repair orders based on inferences gathered from repair orders." U.S. patent application Ser. No. 16/160,100 published on Feb. 14, 2019 as United States Patent Application Publication No. 2019/0050826 A1. U.S. patent application Ser. No. 16/160,100 is a continuation application of U.S. patent application Ser. No. 14/933,337.

U.S. patent application Ser. No. 14/933,337 was filed on Nov. 5, 2015 and is entitled "Methods and systems for clustering of repair orders based on inferences gathered from repair orders." U.S. patent application Ser. No. 14/933,337 published on May 11, 2017 as United States Patent Application Publication No. 2017/0132577 A1 and issued on Nov. 20, 2018 as U.S. Pat. No. 10,134,013.

U.S. patent application Ser. No. 16/160,100, U.S. patent application Ser. No. 14/933,337, United States Patent Application Publication No. 2019/0050826 A1, and United States Patent Application Publication No. 2017/0132577 A1 are incorporated herein by reference.

INCORPORATION BY REFERENCE

U.S. patent application Ser. No. 14/270,994, filed on May 6, 2014, is incorporated herein by reference, as if fully set forth in this description.

BACKGROUND

Many products produced by manufacturers occasionally have to be repaired. Many owners are unequipped or otherwise unable to repair certain products. Such owners may depend on professional repair technicians to service or repair the owner's product.

The repair technicians typically repair products at a product repair shop. A repair shop has traditionally produced a repair order (RO) to capture a variety of information regarding a request for servicing or repairing a product. As an example, the captured information can include information identifying the product, the product's owner, the repair shop, the date of repair, and the type of repair or service needed or performed. The RO can exist in various formats such as a paper format or an electronic format.

Product manufacturers use a significant amount of resources (e.g., human and financial) to generate repair information, such as repair manuals and technical service bulletins, that repair technicians can reference while diagnosing and repairing a product. It may be beneficial to product manufacturers if the repair information can be generated automatically by a computing device. It may be beneficial to product manufacturers and repair technicians if the repair information provided to the repair technicians is automatically generated based on RO information.

OVERVIEW

Example implementations are described herein. In one aspect, a method is disclosed. The method involves determining, by at least one processor, that a particular computer-readable vehicle repair order (RO) corresponds to an existing cluster of ROs due to the particular RO including RO data that refers to a particular vehicle symptom. This existing cluster is arranged to contain ROs that correspond to the particular vehicle symptom. Also, the particular RO includes at least a first RO portion and a second RO portion. The method also involves determining, by the at least one processor, that the first RO portion includes first data representative of a non-specific vehicle component. The method additionally involves, in response to determining that the first RO portion includes the first data, the at least one processor determining that the second RO portion includes second data that the at least one processor can use to determine a specific vehicle component associated with the particular RO. The method further involves, in response to determining that the second RO portion includes the second data, the at least one processor determining the specific vehicle component based on the first and second data. The method yet further involves, in response to determining the specific vehicle component, the at least one processor adding the particular RO to a different cluster of ROs. This different cluster is arranged to contain ROs that correspond to the particular vehicle symptom and to the specific vehicle component.

In another aspect, a computing system is disclosed. The computing system includes a data storage device having stored thereon a plurality of computer-readable vehicle repair orders (ROs). The computing system also includes at least one processor coupled to the data storage device and programmed to determine that a particular RO of the plurality of ROs corresponds to an existing cluster of ROs due to the particular RO including RO data that refers to a particular vehicle symptom. This existing cluster is arranged to contain ROs that correspond to the particular vehicle symptom. Also, the particular RO includes at least a first RO portion and a second RO portion. The at least one processor is also programmed to determine that the first RO portion includes first data representative of a non-specific vehicle component. The at least one processor is additionally programmed to, in response to determining that the first RO portion includes the first data, determine that the second RO portion includes second data that the at least one processor can use to determine a specific vehicle component associated with the particular RO. The at least one processor is further programmed to, in response to determining that the second RO portion includes the second data, determine the specific vehicle component based on the first and second data. The at least one processor is yet further programmed to, in response to determining the specific vehicle component, add the particular RO to a different cluster of ROs. This different cluster is arranged to contain ROs that correspond to the particular vehicle symptom and to the specific vehicle component.

In yet another aspect, a computer readable medium is disclosed. The computer readable medium has stored thereon instructions executable by at least one processor to cause a computing system to perform operations. The operations involve determining that a particular computer-readable vehicle repair order (RO) corresponds to an existing cluster of ROs due to the particular RO including RO data that refers to a particular vehicle symptom. This existing cluster is arranged to contain ROs that correspond to the particular vehicle symptom. Also, the particular RO includes at least a first RO portion and a second RO portion. The operations also involve determining that the first RO portion includes first data representative of a non-specific vehicle component. The operations additionally involve, in response to determining that the first RO portion includes the first data, determining that the second RO portion includes second data that the at least one processor can use to determine a specific vehicle component associated with the particular RO. The operations further involve, in response to determining that the second RO portion includes the second data, determining the specific vehicle component based on the first and second data. The operations yet further involve, in response to determining the specific vehicle component, adding the particular RO to a different cluster of ROs. This different cluster is arranged to contain ROs that correspond to the particular vehicle symptom and to the specific vehicle component.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the following drawings.

FIG. 4 shows a repair order in accordance with one or more example embodiments.

FIG. 5 shows a repair order including auto-generated repair-hint and meta-data.

FIG. 6 is a flowchart depicting a set of functions that can be carried out in accordance with one or more example embodiments.

DETAILED DESCRIPTION

I. Introduction

Figure 1:
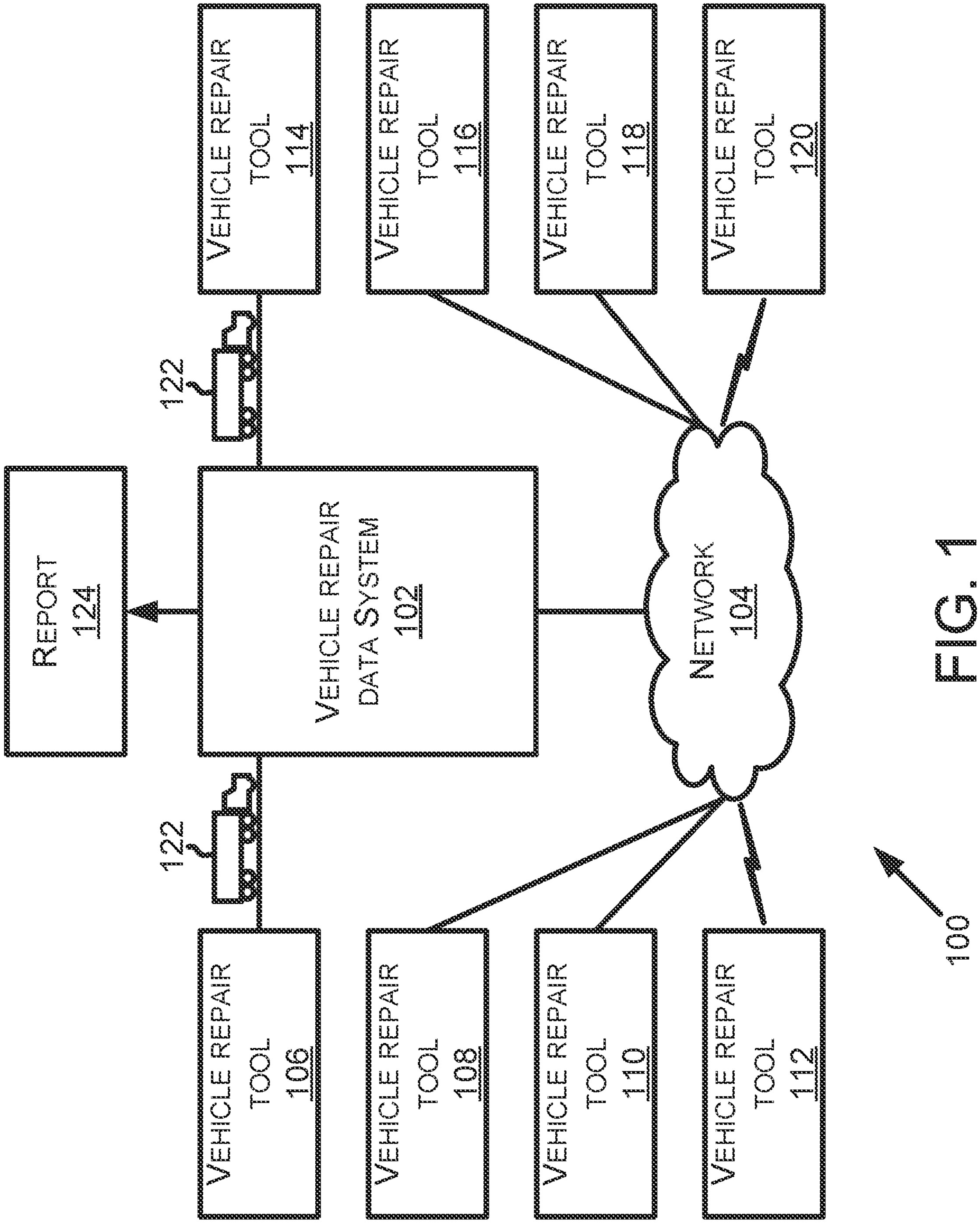
FIG. 1 is a block diagram of a system in accordance with one or more example embodiments.

This description describes several example embodiments including example embodiments regarding disambiguation. At least some of the example embodiments include, but are not limited to include, one or more of the following features: determining that a particular computer-readable vehicle repair order (RO) (e.g., including at least first and second RO portions) corresponds to an existing cluster of ROs (e.g., arranged to contain ROs that correspond to the particular vehicle symptom) due to the particular RO including RO data that refers to a particular vehicle symptom, determining that the first RO portion includes first data representative of a non-specific vehicle component, determining that the second RO portion includes second data that the at least one processor can use to determine a specific vehicle component associated with the particular RO, determining the specific vehicle component based on the first and second data, and adding the particular RO to a different cluster of ROs (e.g., arranged to contain ROs that correspond to the particular vehicle symptom and to the specific vehicle component).

A vehicle repair tool can include any of a variety of repair tools a repair technician, a product owner, a person working at a repair shop, or some other person can use to repair a vehicle. Repairing a vehicle can include, but is not limited to include, diagnosing a vehicle, servicing a vehicle, performing maintenance (e.g., preventive maintenance) on a vehicle, or verifying a repair performed on a vehicle to correct a vehicle malfunction. Accordingly, a vehicle repair tool can be referred to as one or more of the following terms: a vehicle diagnostic tool, a vehicle service tool, a vehicle maintenance tool, and a vehicle repair verification tool, or more generally, a machine.

A vehicle is a mobile machine that may be used to transport a person, people, or cargo. As an example, any vehicle described herein may be driven or otherwise guided along a path (e.g., a paved road or otherwise) on land, in water, or in the air or outer space. As another example, any vehicle described herein may be wheeled, tracked, railed or skied. As yet another example, any vehicle described herein may include an automobile, a motorcycle, a light-duty truck, a medium-duty truck, a heavy-duty truck, a semi-tractor, or a farm machine. As still yet another example, any vehicle described herein may include or use any appropriate voltage or current source, such as a battery, an alternator, a fuel cell, and the like, providing any appropriate current or voltage, such as about 12 volts, about 42 volts, and the like. As still yet another example, any of the vehicles described herein may include or use any desired system or engine. Those systems or engines may include items that use fossil fuels, such as gasoline, natural gas, propane, and the like, electricity, such as that generated by a battery, magneto, fuel cell, solar cell and the like, wind and hybrids or combinations thereof. As still yet another example, any vehicle described herein may include an electronic control unit (ECU), a data link connector (DLC), and a vehicle communication link that connects the DLC to the ECU.

Although many of the example embodiments are described with respect to a vehicle, the example embodiments can be applicable to products or repairable items other than a vehicle. As an example, the other products or repairable items can include home appliances, such as a refrigerator, a dishwasher, or a washing machine, or a consumer electronic device, such as a television, a cellular phone, or a tablet device. Other examples of the other products or repairable items are also possible. Accordingly, for embodiments based on these other products or repairable items, the term vehicle in the described embodiments can be replaced with a name of the other product or repairable item.

In this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements. For purpose of this description, the terms "multiple" and "a plurality of" refer to "two or more" or "more than one."

The block diagram(s) and flow chart(s) shown in the figures are provided merely as examples and are not intended to be limiting. Many of the elements illustrated in the figures or described herein are functional elements that can be implemented as discrete or distributed elements or in conjunction with other elements, and in any suitable combination and location. Those skilled in the art will appreciate that other arrangements and elements (e.g., machines, interfaces, functions, orders, or groupings of functions) can be used instead. Furthermore, various functions described as being performed by one or more elements or a machine described herein can be carried out by a processor executing computer-readable program instructions or by any combination of hardware, firmware, or software.

II. Example Architecture

FIG. 1 is a block diagram of a system 100 in accordance with one or more example embodiments. Various combinations of the elements shown in FIG. 1 can be arranged as other systems or as a sub-system to carry out example embodiments described herein. System 100 includes a vehicle repair data (VRD) system 102 and a network 104. Network 104 can include a wide area network (WAN), such as the Internet or a portion thereof. Additionally or alternatively, network 104 can include a wireless network, a wired network, a local area network (LAN), or some other type of network. Network 104 can include two or more of the aforementioned example networks.

System 100 includes a vehicle repair tool (VRT) 106, and VRT 108, 110, 112, 114, 116, 118, and 120. Each VRT or a combination of multiple VRT can include or be arranged as a machine. Any VRT described herein can be, but is not required to be, configured to generate or transmit an original repair order (RO) to VRD system 102. An RO generated by a VRT can be provided to an operator of VRD system 102 by a courier 122, such as the United States Postal Service or the Federal Express Corporation. The operator of VRD system 102 can enter an original RO into VRD system 102 using an RO manual entry device, such as an RO manual entry device 202 shown in FIG. 2. The manually-entered RO can be stored in a data storage device, such as a data storage device 210 shown in FIG. 2.

VRT 114, 116, 118, and 120 represent vehicle repair tools that are configured to perform at least one of the following functions: request a repair-hint (e.g., an auto-generated repair hint) stored at VRD system 102, receive a repair-hint transmitted from VRD system 102 using network 104 or otherwise provided or generated by VRD system 102, and present a repair-hint by a user interface. A repair-hint generated by VRD system 102 can be provided to an operator of a VRT, such as VRT 114, by courier 122. As an example, courier 122 can provide the repair-hint by providing the VRT operator with a computer-readable medium, such as a CD-ROM, including a repair-hint generated by VRD system 102. VRT 116, 118, and 120 can receive a repair-hint generated by VRD system 102 and transmitted to the VRT using wireless or wired communications and network 104.

A VRT can include a code reader, such as a one-dimensional bar code reader or a two-dimensional bar coder reader. The code reader can read and decode a code on a vehicle, such as a VIN bar code, a code on a replacement part, such as a bar code or quick-response code on packaging of a replacement part, or some other type of code. Data encoded from a code can be entered onto an original RO, such as original RO 400 shown in FIG. 4.

Figure 2:
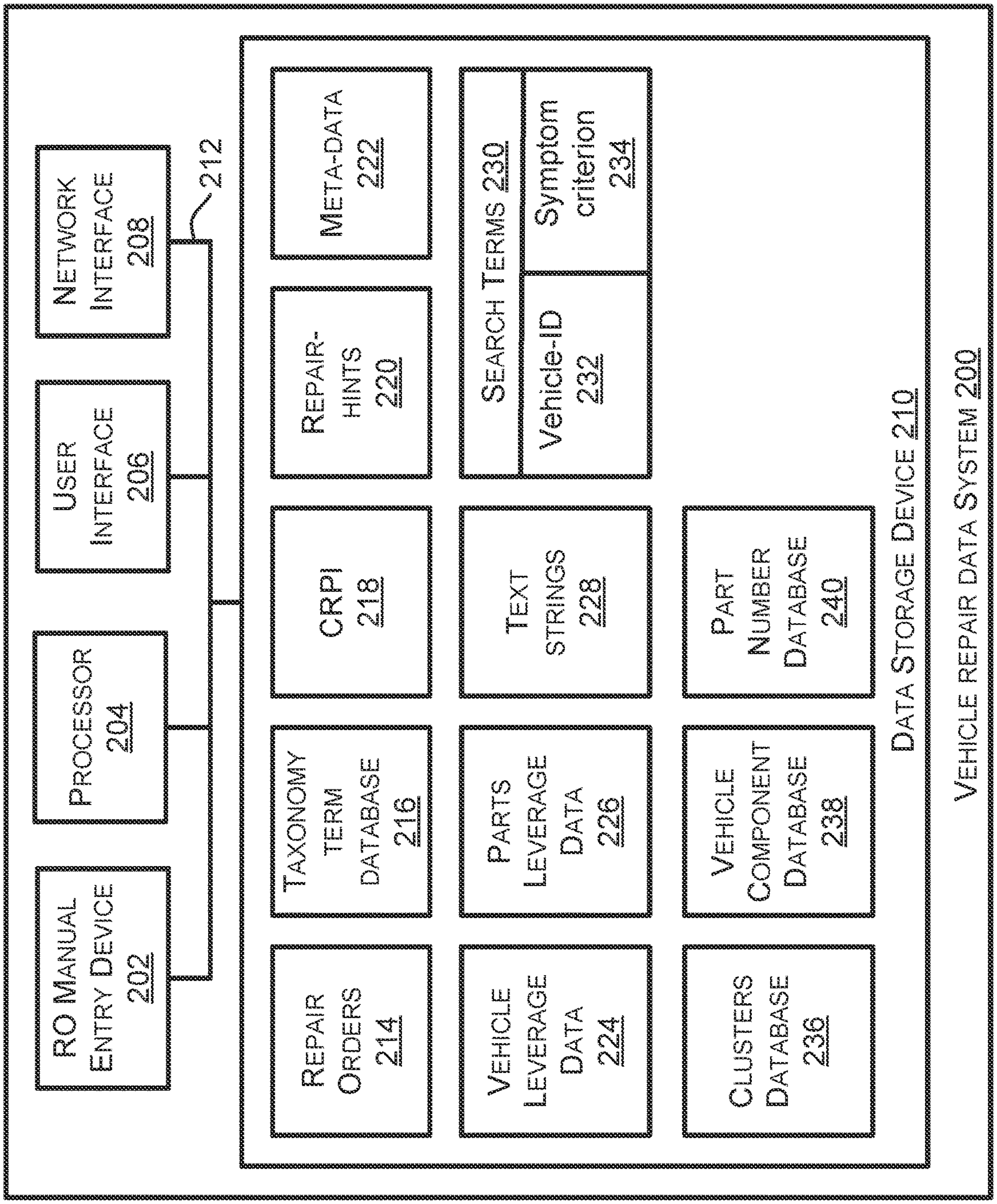
FIG. 2 is a block diagram of a vehicle repair data (VRD) system in accordance with one or more example embodiments.

Next, FIG. 2 is a block diagram showing details of a vehicle repair data (VRD) system 200. VRD system 102, shown in FIG. 1, can be configured similar to VRD system 200. VRD system 200 can be configured like VRD system 102 shown in FIG. 1. VRD system 200 can include or be arranged as a machine. VRD system 200 or one or more components thereof can be arranged or referred to as a computing system or a computer system. VRD system 200 can comprise, be configured as, or be referred to as a server system, a server device, or more simply, a server. In accordance with embodiments in which VRD system 200 operates as a server, VRD system 200 can serve one or more vehicle repair tools (VRT) operating as a client device to the server.

VRD system 200 includes the RO manual entry device 202, a processor 204, a user interface 206, a network interface 208, and a data storage device 210, all of which can be linked together via a system bus, network, or other connection mechanism 212.

RO manual entry device 202 can include one or more devices for inputting data shown on a printed RO into VRD system 200 for storage as an original RO within repair orders (RO) 214. As an example, RO manual entry device 202 can include a scanner device with or without an optical character recognition software application. As another example, RO manual entry device 202 can include a keyboard for keying in (e.g., typing) the data shown on the printed RO and sending the keyed in (e.g., typed or otherwise entered) data to processor 204 for storage as an original RO within RO 214. As yet another example, RO manual entry device 202 can include a device that accepts data storage devices, such as a CD-ROM including data representing an original RO generated by a VRT. As yet another example, RO manual entry device 202 can include a laptop or desktop computing device with or connected to a display.

An original RO can be displayed by RO manual entry device 202 or user interface 206. For any of a variety of reasons, such as security of information located on an original RO, VRD system 102 can be configured such that an original RO generated by a first VRT, such as VRT 106, is not provided to a second VRT, such as VRT 116. VRD system 102 can generate a presentable RO based, at least in part, on information on the original RO generated by the VRT 106, and provide the presentable RO to VRT 116.

A processor, such as processor 204, can include one or more general purpose processors (e.g., INTEL single core microprocessors or INTEL multicore microprocessors) or one or more special purpose processors (e.g., digital signal processors). A processor, such as processor 204, can be configured to execute computer-readable program instructions, such as computer-readable program instructions (CRPI) 218. For purposes of this description, processor 204 executing CRPI 218 to perform some function described herein can include executing a portion of CRPI 218 or the entirety of CRPI 218. Executing a portion or the entirety of CRPI 218 can include executing some of the computer-readable program instructions multiple times. Processor 204 can be programmed to perform any one or any combination of functions performed by execution of a program instruction of CRPI 218.

User interface 206 can include an interface to components operable to enter data or information into VRD system 200 or to components that can present data or information output by VRD system 200. Those components can be referred to as user interface components. User interface 206 can include one or more audio/visual ports or communication ports that connect to a user interface component by a wired or wireless user interface communication link.

User interface 206 can include one or more of the user interface components. As an example, the user interface components can include an infrared remote control device, a display device, a loud speaker configured to convert electrical signals to audible sounds, a keyboard, a touch screen, a pointing device, such as a computer mouse, or some other component for generating signals to enter data or information into VRD system 200 or to present data or information output by user interface 206.

User interface 206 can include a transmitter or transceiver to provide the data or information to another user interface component or to another element of VRD system 200. The data or information provided by user interface 206 can include, but is not limited to include, a repair-hint of repair-hints 220.

Network interface 208 can include an interface to one or more communication networks, such as network 104. For use with wireless communication networks, network interface 208 can include one or more antennas for transmitting or receiving wireless communications. Network interface 208 can include one or more communication ports configured to connect to a wired communication link of a network, such as a coaxial cable, an Ethernet cable, a fiber optic cable, a digital subscriber line (DSL), a telephone line of a public switched telephone network (PSTN) or some other wired connector. Network interface 208 can include a network controller including a transmitter, a receiver, or a transceiver. The transmitter or transceiver can provide data or information to a communication port for transmission as network communications over the connected network. The receiver or transceiver can receive data or information received at a communication port from the connected network.

A data storage device, such as such as data storage device 210 or any other data storage device discussed in this description or included within a device or system described in this description, may include a non-transitory computer-readable medium, a transitory computer-readable medium, or both a non-transitory computer-readable medium and a transitory computer-readable medium. In one respect, a non-transitory computer-readable medium may be integrated in whole or in part with a processor. In another respect, a non-transitory computer-readable medium, or a portion thereof, may be separate and distinct from a processor.

A non-transitory computer-readable medium may include, for example, a volatile or non-volatile storage component, such as an optical, magnetic, organic or other memory or disc storage. Additionally or alternatively, a non-transitory computer-readable medium may include, for example, a random-access memory (RAM), a read-only memory (ROM), a programmable read-only memory (PROM), an erasable programmable read-only memory (EPROM), an electrically erasable programmable read-only memory (EEPROM), a compact disk read-only memory (CD-ROM), or another memory device that is configured to provide data or CRPI to a processor.

A transitory computer-readable medium may include, for example, CRPI provided over a communication link, such as a communication link which is connected to or is part of the network 104. The communication link may include a digital or analog communication link. The communication link may include a wired communication link or a wireless communication link.

A computer-readable medium may be referred to by other terms such as a "computer-readable storage medium," a "data storage device," a "memory device," a "memory," or a "computer-readable database." Any of those alternative terms may be preceded with the prefix "transitory" or "non-transitory."

Data storage device 210 can store a variety of data. The data stored by data storage device 210 can be data that was provided to data storage device 210 for storage from RO manual entry device 202, processor 204, user interface 206 or network interface 208. As shown in FIG. 2, data storage device 210 can store repair orders (RO) 214, a taxonomy term database 216, computer-readable program instructions (CRPI) 218, repair hints 220, meta-data 222, vehicle leverage data 224, parts leverage data 226, text strings 228, and search terms 230. Search terms 230 can include, but is not limited to, vehicle-identification (i.e., vehicle-ID) search terms 232, such as year/make/model/engine (Y/M/M/E) attributes, and symptom criterion 234.

RO 214 can include computer-readable RO. The computer-readable RO can be arranged as a structured query language (SQL) file, an extensible markup language (XML) file, or some other type of computer-readable file or data structure. The RO within RO 214 can be received from RO manual entry device 202, from network interface 208 by way of network 104, or from another device. The RO within RO 214 can be an original RO, such as RO generated by a VRT shown in FIG. 1 or entered using RO manual entry device 202, or a presentable RO generated by VRD system 200.

FIG. 4 shows an example original RO 400. Original RO 400 can be generated by a VRT, such as any VRT shown in FIG. 1. Original RO 400 can include a computer-readable-data RO (or more simply, computer-readable RO) transmitted over network 104. Original RO 400 can include a paper-copy RO, such as carbonless multi-sheet RO or some other type of paper-copy RO. Original RO 400 can include both a computer-readable-data version and a paper-copy version. A paper-copy RO can be generated without using a VRT. A computer-readable RO generated from a paper-copy RO can be an original RO.

Original RO 400 includes a service provider identifier 402, a date of service identifier 404, a customer indicator 406 that indicates a customer seeking service of a given vehicle, vehicle information 408 that indicates the given vehicle, vehicle service requests 410, 412, and 414 indicating the complaint(s) or service(s) requested by the customer, parts information 416 indicating parts obtained for servicing the given vehicle, service procedure information 418, 420, and 422 carried out on the given vehicle, and a vehicle-usage indicator 430 (e.g., vehicle mileage data that indicates a number of miles the given vehicle has been driven). The vehicle-usage indicator 430 on original RO 400 can indicate a driven distance using kilometers or some other units as an alternative or in addition to vehicle mileage data. In addition to or as an alternative to indicating a distance, the vehicle-usage indicator 430 can include a time-used indicator such as an hours indicator indicating, for example, how long a vehicle or an engine has been used.

Service provider identifier 402 can include information that indicates a name and geographic location of the service provider. Vehicle information 408 can include a vehicle identification number (VIN) 432 associated with the given vehicle and a description of the given vehicle. Service procedure information 418, 420, and 422 can include information within distinct RO sections 424, 426, and 428, respectively, of original RO 400. The service procedure information within any one distinct RO section 424, 426, and 428 can be unrelated to the service procedure information with any other distinct section. Alternatively, two or more distinct sections including service procedure information can pertain to related service operations performed on the given vehicle.

Original RO 400 includes labor operation codes (LOCs). The LOCs can conform to those defined by a vehicle manufacturer, a service provider that generates an RO, a service information provider, such as Mitchell Repair Information, LLC, Poway, California, or some other entity. For simplicity of FIG. 4, the LOCs are shown within parenthesis, such as (C45) and (C117, C245). Distinct LOC within parenthesis are separate by a comma. Each labor operation code (LOC) can refer to a particular operation performed to the given vehicle. Processor 204, executing CRPI 218, can use a LOC to determine what type of service or repair operation was performed to the given vehicle. Using the LOC in that manner is helpful if other information regarding that operation is incomplete or described using non-standard phrases or terms. Processor 204 can also use LOC to determine context for the service procedure information on or within the RO.

Multiple portions of text on an RO, such as original RO 400, can be grouped as phrases. When comparing contents of an RO to various terms of taxonomy term database 216, such as mapping terms, standard terms, or context terms, words within a given proximity to one or more other words on original RO 400 can be grouped as a phrase to be compared to the mapping, standard, or context terms. The given proximity can be within X words, where X equals 1, 2, 3, 4, 5, or some other number of words. As an example, service procedure information 418 states "Check starter/ignition system." The words "Check" and "ignition system" are within 3 words of one another. In accordance with an embodiment in which the given proximity is 4 word, the words "Check" and "ignition system" can be grouped as the phrase "Check ignition system" for comparison to mapping, standard, context terms, or labor operation codes.

The mapping, standard, context terms, or labor operation codes can be stored as part of taxonomy term database 216. Taxonomy term database 216 can include data that identifies words or phrases that are associated with one another. The association can be based on the words or phrases having a common meaning. The words or phrases identified as being associated with one another can be referred to a "taxonomy database group" or, more simply, a "taxonomy group."

Taxonomy term database 216 can include one or more taxonomy groups, and each taxonomy group can include one or more taxonomy terms (e.g., words or phrases). As an example, taxonomy term database 216 can include data that identifies the following phrases as a taxonomy group: (i) stalls when cold, (i) engine quits when temperature is low, (iii) engine dies in the morning, (iv) dies in the morning, (v) dies in the AM, and (vi) engine stalls on cold mornings.

Each taxonomy group can be associated with a standard term, which could be a first word or first phrase added to the taxonomy group. Alternatively, a word or phrase subsequently added to the taxonomy group can be the standard term for the taxonomy group. The words or phrases other than the standard term within a taxonomy group can be mapping terms. The words or phrases within each taxonomy group can be obtained from an RO. An administrator can approve adding or modifying any taxonomy group by, for example, processor 204 executing CRPI 218. Terms within taxonomy term database 216 can be compared to terms on a computer-readable RO. A mapping term on an original RO and found within a given taxonomy group can be represented on a presentable RO by a standard term for the given taxonomy group.

RO 214 can include original RO 400 as a computer-readable version of original RO 400. RO 214 can include one or more other computer-readable RO arranged like original RO 400 and one or more other computer-readable RO arranged in an RO configuration that differs from original RO 400. The other RO configurations typically include at least one of the types of information described above as being a part of original RO 400.

An RO stored within RO 214, such as original RO 400 or another RO, can include searchable text or symbols (e.g., text, symbols, or text and symbols). As an example, a symbol on an RO can include an empty check box or a checkbox and a checkmark inside the checkbox. Original RO 400 can be modified to include a presentable RO 500 (shown in FIG. 5) that represents original RO 400 or data thereon. Additionally or alternatively, presentable RO 500 can be distinct and separate from original RO 400.

Processor 204 can search the text, symbols or other content on an RO of RO 214 or the meta-data associated with an RO to associate an RO within a computer-readable cluster of RO (or more simply, an RO cluster). Each cluster of RO can be associated with defined RO attributes, such as a diagnostic trouble code (DTC), action, or component listed on the RO. Other attributes of the information recorded on an RO can be associated with an RO cluster. Table 1 shows data identifying twenty-five clusters identified with ID 1 through 25, inclusive. The cluster size indicates how many RO have been associated with the respective cluster. The cluster size can be modified as or after additional RO are added to RO 214 or after an RO is transferred from one cluster to a different cluster. Table 1 shows examples of DTC, Action, and component attributes associated with each respective RO cluster.

TABLE 1

| Cluster ID | Cluster Size | DTC | Action | Component(s) |
|---|---|---|---|---|
| 1 | 3,101 | P0303 | Replaced | Ignition Coil |
| 2 | 3,086 | P0303 | Replaced | Spark Plug |
| 3 | 2,982 | P0302 | Replaced | Ignition Coil |
| 4 | 2,957 | P0304 | Replaced | Spark Plug |
| 5 | 2,831 | P0171 | Replaced | Oxygen Sensor |
| 6 | 2,813 | P0325 | Replaced | Knock Sensor |
| 7 | 2,762 | P0301 | Replaced | Spark Plug |
| 8 | 2,713 | P0320 | Replaced | Crankshaft Position Sensor |
| 9 | 2,624 | P0404 | Replaced | Exhaust Gas Recirculation Valve |
| 10 | 2,609 | P0302 | Replaced | Spark Plug |
| 11 | 2,603 | P0303 | Replaced | Spark Plug Wire, Spark Plug |
| 12 | 2,328 | P0161 | Replaced | Oxygen Sensor |
| 13 | 2,324 | C1500 | Replaced | Fuel Filter, Fuel Tank Module |
| 14 | 2,232 | P0301 | Replaced | Spark Plug Wire, Spark Plug |
| 15 | 2,225 | P0302 | Replaced | Spark Plug Wire, Spark Plug |
| 16 | 2,107 | P0300 | Replaced | Ignition Coil |
| 17 | 2,104 | P0305 | Replaced | Ignition Coil |
| 18 | 2,088 | P0171, P0174 | Replaced | Mass Airflow Sensor |
| 19 | 2,007 | P0134 | Replaced | Oxygen Sensor |
| 20 | 1,991 | P0304 | Replaced | Spark Plug Wire, Spark Plug |
| 21 | 1,963 | P0171, P0174 | Replaced | Fuel Filter |
| 22 | 1,952 | P0306 | Replaced | Ignition Coil |
| 23 | 1,899 | P0128 | Replaced | Thermostat Housing, Engine Coolant Thermostat |
| 24 | 1,824 | P0125 | Replaced | Engine Coolant Thermostat |
| 25 | 1,783 | P0031 | Replaced | Oxygen Sensor |

Table 1 can be modified to include a separate column for other attributes as well. The other attributes can identify RO attributes such as, but not limited to, a customer complaint, a date, or a labor operation code (LOC). As an example, the customer complaint can include, but is not limited to, terms such as rattles, won't start, and vibrates. Auto-generated repair-hints for those example customer complaint terms can include repair hints identifying a way to stop a vehicle from rattling, a way to fix a vehicle that does not start, and a way to stop a vehicle from vibrating, respectively.

Table 2 below shows an example of data included on 25 of the 2,088 RO associated with the RO cluster ID 18 shown in Table 1. The RO data in Table 2 includes an RO identifier that can, for example, be assigned by a VRT or VRD system 102. The RO data in Table 2 also includes year/make/model/engine attributes associated with each RO.

TABLE 2

| RO ID | Year | Make | Model | Engine |
|---|---|---|---|---|
| 2197 | 1999 | Cadillac | Catera | 3.0 L V6, VIN (R) |
| 9277 | 1998 | Mercury | Grand Marquis GS | 4.6 L V8, VIN (W) |
| 1156 | 2002 | Ford | Pickup F150 | 4.2 L, V6 VIN (2) |
| 6978 | 2003 | Ford | Taurus SE | 3.0 L V6, VIN (U) |
| 7923 | 1999 | Ford | Pickup F150 | 4.6 L V8, VIN (W) |
| 5074 | 2000 | Infiniti | I30 | 3.0 L V6, VIN (C) |
| 5640 | 1997 | Ford | Cutaway E350 | 6.8 L, V10, VIN (S) |
| 1037 | 2002 | Land Rover | Range Rover HSE | 4.6 L, V8, VIN (4) |
| 1509 | 2002 | Ford | Explorer | 4.0 L, V6-245, SOHC |
| 1673 | 2006 | Ford | Explorer | 4.0 L, V6-245, SOHC |
| 2088 | 1998 | Ford | Cutaway E350 | 6.8 L, V10, VIN (S) |
| 4692 | 2006 | Ford | Pickup F250 Super Duty | 5.4 L, V8 VIN (5) |
| 5183 | 1996 | Mercury | Grand Marquis GS | 4.6 L, V8, VIN (W) MFI |
| 6825 | 2000 | Saturn | LS2 | 3.0 L, V6, VIN (R) |
| 8203 | 2001 | Hyundai | XG300 | 3.0 L V6, VIN (D) |
| 3915 | 1997 | Ford | Crown Victoria LX | 4.6 L, V8, VIN (W) |
| 7481 | 2001 | Nissan | Pathfinder SE | 3.5 L, V6-3498, DOHC |
| 7833 | 2007 | Chevrolet | Silverado Classic | 6.0 L, V8, VIN (U) |
| 7976 | 1997 | Ford | Thunderbird LX | 4.6 L, V8, VIN (W) |
| 9892 | 2000 | Nissan | Maxima GLE | 3.0 L V6, VIN (C) |
| 0156 | 1999 | Ford | Econoline E150 | 4.6 L, V8, VIN (6) |
| 1194 | 2002 | Ford | Pickup F150 | 4.2 L V6, VIN (2) |
| 8797 | 2006 | Ford | Crown Victoria LX | 4.6 L V8, VIN (W) |
| 6321 | 2000 | Ford | Explorer | 4.0 L V6, VIN (X) |
| 6924 | 1998 | Ford | Ranger | 4.0 L V6, VIN (X) |

Some vehicle models are associated with a sub-model attribute. Some vehicle models are not associated with a sub-model attribute. Table 2 can be modified to include a separate column to include sub-model attributes for vehicles that are associated with a sub-model attribute. As an example, RO ID 7923 pertains to a Ford Pickup F150 make and model. The term "F150" can be referred to as a sub-model attribute. Other sub-model attributes for Ford Pickup models can include the "F250" and "F350" sub-model attributes. A sub-model attribute can be included on an RO. Searching for RO or repair-hints based on a sub-model in addition to Y/M/M/E attributes can lead to search results having RO or repair-hints associated with a particular sub-model, but not the other sub-model(s) of a particular vehicle having particular Y/M/M/E attributes. The "S" within Y/M/M/S/E can represent a sub-model attribute.

Table 2 can be modified to include a separate column for other attributes as well. The other attributes can identify system (Sys) attributes such as, but not limited to, a transmission attribute, a suspension attribute, and an audio system attribute. A set of attributes including a system attribute can be referred to as Y/M/M/E/Sys attributes.

Vehicle leverage data 224 can include computer-readable data that identifies different vehicle models built on a common vehicle platform. Vehicles built on a common vehicle platform can have many similarities including the use of common parts or part numbers. Vehicles built on a common platform can experience similar vehicle symptoms that arise for similar reasons, such as failure of a part common to vehicles built on the common vehicle platform. Table 3 shows an example of data that can be stored as vehicle leverage data 224.

Processor 204 can generate an RO cluster that covers multiple vehicle models, such as the three vehicle models of VLD-3 shown in Table 3. If RO 214 includes 100 RO for the Chevrolet Lumina APV model between 1990-1996 and a given repair condition, 150 RO for the Pontiac Tran Sport models between 1990-1996 and the given problem, and 40 RO for the Oldsmobile Silhouette model between 1990-1196 and the given problem, processor 204 can generate three separate RO clusters for the 290 RO or a single RO cluster for the 290 RO. A greater quantity of RO can indicate a greater likelihood of a successful repair of the given problem.

TABLE 3

| Vehicle Leverage Data Identifier (VLD ID) | Vehicle Models | Model Year(s) | Exceptions |
|---|---|---|---|
| VLD-1 | Cadillac Escalade, Chevrolet Tahoe, Chevrolet Suburban, GMC Yukon | 2011-2013 | GMC Yukon uses hi-capacity radiator |
| VLD-2 | Chevrolet Lumina APV, Pontiac Trans Sport, Oldsmobile Silhouette | 1990-1996 | N.A. |
| VLD-3 | Buick Regal, Oldsmobile Intrigue | 1998-2002 | N.A. |
| VLD-4 | Ford Expedition, Lincoln Navigator | 2008-2014 | Lincoln Navigator uses aluminum cylinder heads |

Processor 204 can use the exception data within vehicle leverage data 224 to exclude RO pertaining to certain vehicle models from an RO cluster associated with a group of vehicles built on a common platform. For the exception data in Table 3, since the GMC Yukon uses a different radiator than the Cadillac Escalade, the Chevrolet Tahoe, and the Chevrolet Suburban, an RO cluster pertaining to a radiator for a GMC Yukon may not be grouped with an RO cluster pertaining to a radiator on Cadillac Escalades, Chevrolet Tahoes, and Chevrolet Suburbans.

Parts leverage data 226 can include data that identifies different vehicle models that use a common part produced by one or more part(s) manufacturer. For purposes of this description, a common part is a part that can be used in either of two or more vehicle models without altering the part or any of the two or more vehicles to use the common part. Various references to a common part, such as a part number or part name, used by any or all of the part(s) manufacturer and the manufacturer(s) of the different vehicle models can be used. Vehicle models using a common part can experience similar vehicle symptoms that arise for similar reasons, such as failure of the common part. Table 4 shows an example of data that can be stored as parts leverage data 226.

TABLE 4

| Common Vehicle Part Identifier | Common Vehicle Part | Vehicle Models | Model Year(s) | Part(s) manufacturer |
|---|---|---|---|---|
| PLD-1 | Coolant temperature sensor | Cadillac Escalade | 2012 | Delco Parts, Inc. |
| PLD-1 | Coolant temperature sensor | Chevrolet Tahoe | 2012 | Delco Parts, Inc. |
| PLD-1 | Coolant temperature sensor | Chevrolet Suburban | 2012 | Delco Parts, Inc. |
| PLD-2 | Fuel injector(s) | Honda Accord | 2013 | ACME, Inc. |
| PLD-2 | Fuel injector(s) | Honda Civic | 2013 | ACME, Inc. |

Processor 204 can generate an RO cluster that covers a common vehicle part and multiple vehicle models, such as the coolant temperature sensor and three vehicle models of PLD-1 shown in Table 4. If RO 214 includes 30 RO for the 2012 Cadillac Escalade model and the coolant temperature sensor, 40 RO for the 2012 Chevrolet Tahoe model and the coolant temperature sensor, and 20 RO for the 2012 Chevrolet Suburban model and the coolant temperature sensor, processor 204 can generate three separate RO clusters for the 70 RO or a single RO cluster for the 70 RO. A greater quantity of RO can indicate a greater likelihood of occurrence of a successful repair of a given problem arising from the coolant temperature sensor.

CRPI 218 can include program instructions executable by processor 204 to carry out functions described herein or performable by VRD system 200. CRPI 218 can include program instructions that are executable to parse data from an original RO stored within RO 214 and to identify the service procedure information, vehicle identification, and parts usage information from the original RO for use in generating a presentable RO or to increment a count of a cluster size if a presentable RO pertaining to the original RO has already been generated, or to decrement a cluster size if processor 204 transfers an RO from one cluster to a different cluster.

CRPI 218 can include program instructions executable by processor 204 to generate, for each auto-generated repair-hint and based on the RO stored in RO 214, meta-data associated with at least one set of search terms. Meta-data 222 can include meta-data generated by processor 204 based the information listed on original RO 400 including, but not limited to the LOC and a definition of the LOC.

CRPI 218 can include program instructions executable by processor 204 to determine that words or phrases within service procedure information, such as service procedure information 418, 420, or 422, are within one or more taxonomy groups of taxonomy term database 216, and to associate (e.g., relate) that service procedure information with the one or more taxonomy groups. The service procedure information associated with any given taxonomy group can be part of a new RO cluster or additional service procedure information to be added to an RO cluster or to modify an RO cluster.

CRPI 218 can include program instructions executable by processor 204 to perform any one or more of the operations, functions, or actions illustrated in blocks 602-610 in FIG. 6 and as described below in this description.

Text strings 228 can include strings of text (e.g., two or more words, numbers or symbols). A text string can include one or more gaps for inserting meta-data to complete the text string. A text string can include a complete text string without any gaps. Processor 204 can select one or more text strings to associate with a set of terms (e.g., search terms) that can be entered or received to search for a repair hint of repair hints 220. Processor 204 can select the meta-data to insert into the gap(s) of a text string. Text strings 228 can include text strings entered by user interface 206. Text strings 228 can include text strings received by network interface 208.

Search terms 230 can include various sets of search terms. A set of search terms can include vehicle-ID search terms 232 or a symptom criterion 234. A first example set of search terms can include search terms received by network interface 208 as part of a request for a repair hint. The first example set of search terms can include search terms that are non-standard terms in taxonomy terms database 216 and can be referred to as non-standard search terms (NSST). Processor 204 can identify, within taxonomy term database 216, standard terms that match the search terms received by network interface 208 and then use any standard terms included within the received search terms or identified from taxonomy term database 216 to search for a repair hint. The non-standard search terms stored as part of search terms 230 can subsequently be reviewed by processor 204 or a human using RO manual entry device 202 or user interface 206 for inclusion as part of taxonomy term database 216.

A second example set of search terms can include standard sets of search terms and can be referred to as standard search terms (SST). A standard set of search terms can include standard vehicle-ID search terms, such as Y/M/M/E attributes, defined in taxonomy term database 216 and standard symptom criterion defined in taxonomy term database 216. Processor 204 can associate one or more standard sets of search terms with a repair hint or a repair order. A set of search terms associated with a repair hint or repair order can be stored as meta-data associated with that repair hint or repair order. Taxonomy term database 216 can include search terms 230. The second example set of search terms 230 can be associated with one more sets of search terms like the first example set of search terms.

Table 5 shows an example of search terms that can be stored in search terms 230. NSST-227 is associated with SST-15. SST-15 is associated with RO ID 3915. Repair hint 510 on RO ID 3915 can be identified in response to receiving NSST-227, determining that SST-15 is associated with NSST-227, and determining RO ID 3915 is associated with SST-15. SST-1456 is a set of standard search terms having symptom criterion common to SST-15 and SST-1456, and a Y/M/M/E attribute that differs from the Y/M/M/E for SST-15 only by the model years (i.e., 2000 instead of 1999). SST-15 and SST-1456 are both associated with RO ID 3915. This association can be determined based on vehicle leverage data 224 or parts leverage data 226.

TABLE 5

| Search Terms | Y/M/M/E | Symptom Criterion | Associations |
|---|---|---|---|
| NSST-227 | 97 Ford Crown Vic. 8 cyl. | Emissions and MAF failed. DTC P171 P174. | SST-15 |
| SST-15 | 1999/Ford/Crown Victoria/4.6 L V8 (W) | Pcode: P0171, P0174<br>Component: MAF sensor<br>Work Requested: failed state emissions certification | RO ID 3915<br>NSST-227 |

TABLE 5-continued

| Search Terms | Y/M/M/E | Symptom Criterion | Associations |
|---|---|---|---|
| SST-1456 | 2000/Ford/Crown Victoria/4.6 L V8 (W) | Pcode: P0171, P0174 Component: MAF sensor Work Requested: failed state emissions certification | RO ID 3915 |

The vehicle-ID search terms 232 is one example of search terms that can be included within search terms 230. Vehicle-ID search terms 232 can include various selectable attributes. For example, the attributes of vehicle-ID search terms 232 can include Y/M/M/E attributes. As another example, the attributes of vehicle-ID search terms 232 can include Year/Make/Model/Sub-model/Engine (Y/M/M/S/E) attributes as discussed with respect to Table 2. As another example, the attributes of vehicle-ID search terms 232 can include Year/Make/Model/Engine/System (Y/M/M/E/Sys) attributes. As another example, the attributes of vehicle-ID search terms 232 can include Year/Make/Model/Sub-model/Engine/System (Y/M/M/S/E/Sys) attributes.

The system (Sys) attribute vehicle-ID search terms 232 can indicate or represent a system (e.g., one or more systems) or a component (e.g., one or more components) within a vehicle. As an example, the system or component within the vehicle can identify (i) a powertrain transmission within the vehicle (e.g., a 4-speed automatic transmission with over-drive), (ii) a rear differential within the vehicle (e.g., a rear differential with a 4.11:1 gear ratio), (iii) an electric alternator within the vehicle (e.g., a 100 ampere alternator), (iv) a heater, ventilation, and air-conditioning (HVAC) system installed within the vehicle (e.g., a dual-zone (e.g., a driver side and passenger side) HVAC system), or some other system or component installed within, attached to, or other otherwise operating on or in the vehicle.

The order of any of the vehicle-ID search terms 232 described herein can be rearranged as desired. For example, the order of the Y/M/M/E attributes could be rearranged as Make/Model/Engine/Year (M/M/E/Y) attributes or in another arrangement.

FIG. 5 shows an example content of a presentable RO 500 including an RO identifier 502, RO timing information 504, RO vehicle identifier 506, a vehicle service request 508, an auto-generated repair-hint 510, meta-data 512, and a usage indicator 514. Presentable RO 500 is based on service procedure information 418 an original RO 400. RO identifier 502 is "3915," which is also shown in the seventeenth row of Table 2. RO timing information 504 includes a year designator (i.e., 2009) to indicate a time that pertains to RO ID 3915. That time can indicate, for example, when original RO 400 was written, completed, or submitted to VRD system 102. RO timing information could include other or different time information such as a day, month, or hour-of-a-day. RO vehicle identifier 506 includes the year/make/model/engine attributes shown in the seventeenth row of Table 2 for RO ID 3915. Additional or other attributes of the given vehicle identified on original RO 400 can be included on presentable RO 500.

Presentable RO 500 includes elements in or based on original RO 400. Presentable RO 500 can be stored within data storage device 210 with or as part of original RO 400. Additionally or alternatively, presentable RO 500 can be stored separately and distinctly from original RO 400.

Vehicle service request 508 includes information pertaining to a vehicle service request on an RO within RO 214.

Vehicle service request 508 can include one or more text strings from text strings 228. As an example, each sentence within vehicle service request 508 can be a separate text string. For example, a text string can include the text "Customer states the vehicle has [insert customer complaint]." The text within the square brackets (i.e., [ ]) identifies meta-data or a taxonomy term to be inserted to complete the text string. The portion of a text string within the square brackets can be referred to as a "text string gap" or more simply, "a gap." Processor 204 can select the meta-data or the taxonomy term based on information included on an original RO pertaining to RO ID 3915 received at VRD system 102. The text string "Please diagnose and advise" is an example of a text string without any gaps in which text is to be inserted to complete the text string. The term "MAF sensor" in the text string "Customer states please replace the MAF sensor" can be selected by processor to insert into the text string from meta-data 512.

Auto-generated repair-hint 510 can include one or more text strings from text strings 228. As an example, each sentence within auto-generated repair-hint 510 can be a separate text string. For example, a text string can include the text "Technician scan tested and verified the DTC [insert first Pcode] and DTC [insert second Pcode]." Processor 204 can select the DTC (e.g., Pcode) identifiers "P0171" and "P0174" from meta-data 512 to complete the text string by inserting those DTC (e.g., Pcode) identifiers into the text string gaps. Processor 204 can select the meta-data based on information, such as a LOC, included on an original RO pertaining to RO ID 3915 received at VRD system 102.

As another example, a text string can include multiple sentences within auto-generated repair-hint 510, such as all of the sentences, but the first sentence, within auto-generated repair-hint 510. Processor 204 can select fuel pump pressure readings (e.g., 30 and 40) to insert within the second sentence of that text string, and to select a component name (e.g., MAF sensor) from meta-data 512 or taxonomy term database 216 to insert in the $4^{th}$ through $9^{th}$ sentences of the multiple-sentence text string. Those inserted terms are underlined within FIG. 5.

Meta-data 512 can be stored with presentable RO 500 within RO 214. Additionally or alternatively, meta-data 512 can be stored within meta-data 222 along with a tag or reference to presentable RO 500.

Usage indicator 514 indicates a distance in miles associated with RO 500. Usage indicator 514 can be used by processor 204 to determine whether to select auto-generated repair-hint 510 when searching for a repair-hint based on a set of search terms.

Figure 3:
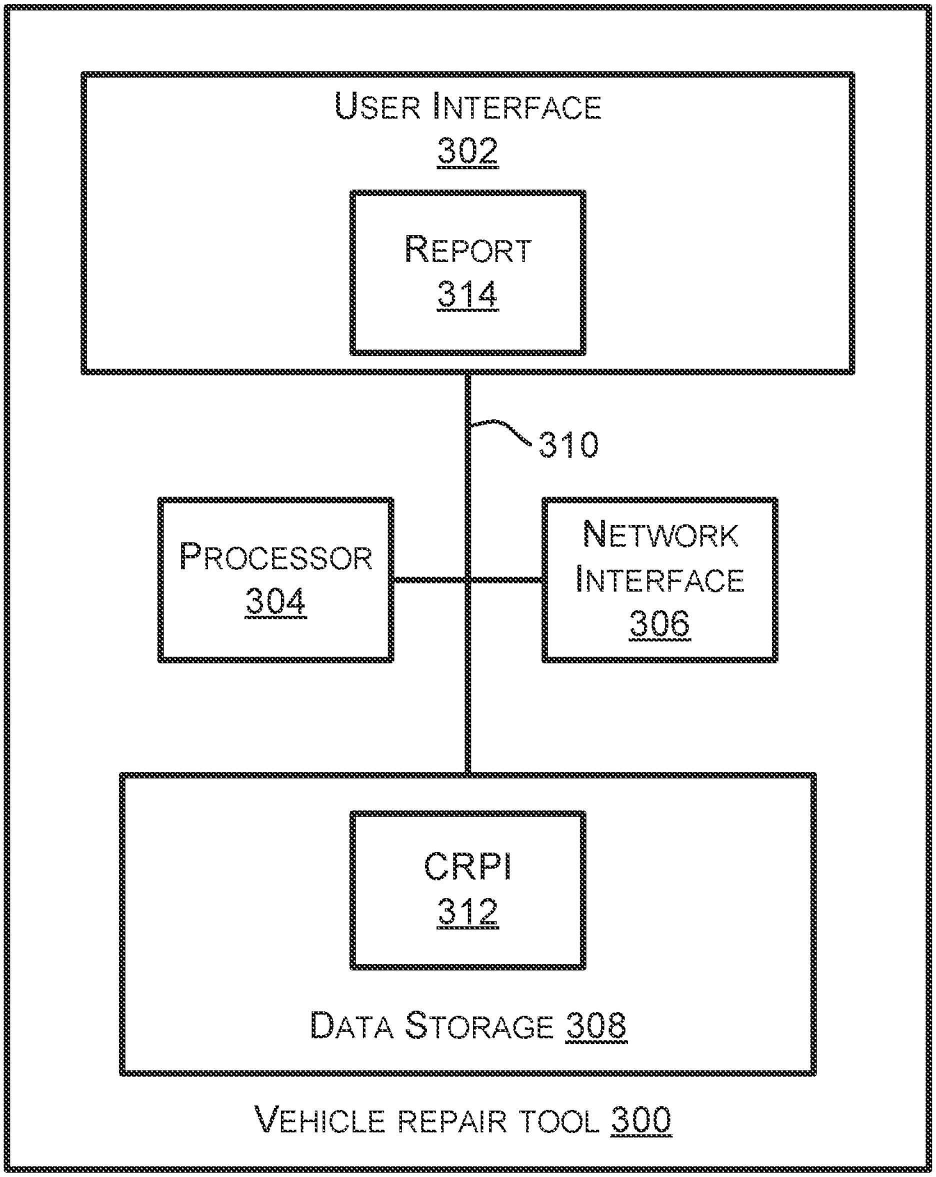
FIG. 3 is a block diagram showing a vehicle repair tool in accordance with one or more example embodiments.

Next, FIG. 3 is a block diagram showing details of example a vehicle repair tool (VRT) 300. VRT 300 can include or be arranged as a machine. VRT 300 includes a user interface 302, a processor 304, a network interface 306, and a data storage device 308, all of which can be linked together via a system bus, network, or other connection mechanism 310. One or more of the VRT shown in FIG. 1 can be arranged like VRT 300. VRT 300 can be used within system 100 like any of the VRT shown in FIG. 1.

Processor 304 can be configured to execute computer-readable program instructions, such as computer-readable program instructions (CRPI) 312 stored within data storage device 308. For purposes of this description, processor 304 executing CRPI 312 to perform some function described herein can include executing a portion of CRPI 312 or the entirety of CRPI 312. Executing a portion or the entirety of CRPI 312 can include executing some of the computer-readable program instructions multiple times.

Data storage device 308 can include a non-transitory computer-readable storage medium (i.e., two or more computer-readable storage mediums) readable by processor 304. The or each non-transitory computer-readable storage medium can include volatile or non-volatile storage components, such as optical, magnetic, organic or other memory or disc storage, which can be integrated in whole or in part with a processor 304.

User interface 302 can include an interface to components that are configured to enter data or information into VRT 300 or to components that are configured to present data or information output by VRT 300. Any of those components can be referred to as a VRT user interface component. User interface 302 can include one or more audio/visual ports or communication ports that connect to a VRT user interface component by a wired or wireless user interface communication link. Data or information entered into VRT 300 by user interface 302 can include data or information for preparing an RO, such as original RO 400.

User interface 302 can include one or more of the VRT user interface components. As an example, the VRT user interface components can include an infrared remote control device, a display device, a loud speaker configured to convert electrical signals to audible sounds, a keyboard, a touch screen, a pointing device, such as a computer mouse, or some other component for generating signals to enter data or information into VRT 300 or to present data or information output by user interface 302. User interface 302 can include a transmitter or transceiver to provide the data or information to another VRT user interface component.

Network interface 306 can include an interface to one or more communication networks, such as network 104. For use with wireless communication networks, network interface 306 can include one or more antennas for transmitting or receiving wireless communications. Network interface 306 can include one or more communication ports configured to connect to a wired communication link of a network. Examples of the wired communication link are listed elsewhere herein. Network interface 306 can include a network controller including a transmitter, a receiver, or a transceiver. The transmitter or transceiver can provide data or information to a communication port for transmission as network communications over the connected network. The receiver or transceiver can receive data or information received at a communication port from the connected network. The data or information provided by network interface 306 to the network can include an RO.

CRPI 312 can include program instructions for generating an RO, such as original RO 400, based on data input by user interface 302 or a user interface component thereof. CRPI 312 can include program instructions for performing diagnostic functions for diagnosing a vehicle identified on an RO. As an example, performing the diagnostic functions can include checking a diagnostic trouble code (DTC), such as a DTC 117, as identified in section 428 of original RO 400. CRPI 312 can include program instructions for (i) displaying, by user interface 302, vehicle-ID attributes selectable to form a set of search terms, symptom criterion selectable to form part of the set of search terms, and a field for entering a usage indicator. (ii) receiving a selection of the set of search terms, (iii) providing the selected set of search terms to network interface 306 for transmission of the selected search terms to VRD system 102, (iv) receiving, by network interface 306, a repair hint, such as an auto-generated repair-hint, from VRD system 102, and (v) displaying the received repair hint using user interface 302.

A VRT, such as VRT 300 or any of the VRT shown in FIG. 1, can include, or be configured as, a smartphone, a tablet device, a laptop computer, a desktop computer, or an embedded computing device, such as the VERDICT™ Diagnostic and Information System and the VERSUS® PRO Integrated Diagnostic and Information System, both of which are available from Snap-on Incorporated, Kenosha, Wisconsin. Accordingly, a VRT can also include computer-readable program instructions to perform features such as, but not limited to, guided component tests, an online expert forum, electrical measurements, waveform capture, displaying vehicle records, etc.

III. Example Operation

FIG. 6 is a flowchart illustrating a method 600, according to an example implementation. Method 600 shown in FIG. 6 (and other processes and methods disclosed herein) presents a method that can be implemented within an arrangement involving, for example, system 100, VRD system 200, and/or VRT 300 (or more particularly by one or more components or subsystems thereof, such as by a processor and a (e.g., non-transitory or transitory) computer-readable medium having instructions that are executable to cause the device to perform functions described herein). Additionally or alternatively, method 600 may be implemented within any other arrangements and systems.

Method 600 and other processes and methods disclosed herein may include one or more operations, functions, or actions as illustrated by one or more of blocks 602-610. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer readable storage medium, for example, or a tangible storage device. In addition, for the method 600 and other processes and methods disclosed herein, each block in FIG. 6 may represent circuitry that is wired to perform the specific logical functions in the process.

At block 602, method 600 involves determining, by at least one processor, that a particular computer-readable vehicle repair order (RO) corresponds to an existing cluster of ROs due to the particular RO including RO data that refers to a particular vehicle symptom, where the existing cluster is arranged to contain ROs that correspond to the particular vehicle symptom, and where the particular RO comprises at least a first RO portion and a second RO portion.

In an example implementation, a processor (e.g., processor 204) may be configured to evaluate a particular RO. This particular RO may be one of the ROs 214 stored in data storage device 210, may be a new RO received from RO manual entry device 202, or may be a new RO received from network interface 208 by way of network 104, among other possibilities. Moreover, this particular RO can be an original RO, such as an RO generated by a VRT shown in FIG. 1 or entered using RO manual entry device 202, or the particular RO may be a presentable RO generated by VRD system 200.

While evaluating the particular RO, the processor 204 may determine that the particular RO corresponds to an existing cluster of ROs. This existing cluster may be a cluster within which the processor 204 has previously associated one or more ROs. Hence, the existing cluster may have cluster size of at least 1 (one), thereby indicating that at least one RO has been associated with this existing cluster. The at least one RO that has been associated with this existing cluster may be the particular RO at issue. That is, the particular RO may have already been associated with the existing cluster and thus the existing cluster already contains the particular RO. Alternatively, the particular RO may be a new RO that has not yet been added to (e.g., associated with) the existing cluster. In this case, the processor 204 may determine that the particular RO corresponds to the existing cluster and should thus be added to the existing cluster so as to increase the cluster size.

More specifically, the existing cluster can be associated with particular defined RO attributes, such as with a particular vehicle symptom for instance. This particular vehicle symptom may be a particular DTC, such as DTC P0171 shown in FIG. 4 for example. Alternatively, this particular vehicle symptom may be one of the symptom criterion 234, such as "Emissions and MAF failed" shown in Table 5 above for example. The particular vehicle symptom could also take on other forms. In either case, the existing cluster may be arranged to contain ROs that correspond to the particular defined RO attributes, such as to the particular vehicle symptom for instance.

In an example arrangement, the processor 204 may determine that the particular RO corresponds to the existing cluster in one of various ways. For example, if the existing cluster already contains the particular RO, the processor 204 may determine that the particular RO corresponds to the existing cluster simply by determining that the existing cluster already contains the particular RO. For instance, this may involve the processor 204 determining the cluster ID associated with the particular RO. To do so, the processor 204 may refer to meta-data 222, which may include meta-data associating certain ROs with certain clusters (e.g., by way of certain cluster IDs). As such, a cluster may contain a certain RO when this certain RO is associated with the cluster, such as by way of being associated with an ID of the cluster for instance.

In another example, whether the existing cluster already contains the particular RO or whether the particular RO is a new RO, the processor 204 may determine that the particular RO corresponds to the existing cluster by determining that the particular RO includes RO attributes that match the above-mentioned particular defined RO attributes. To do so, processor 204 can search the text, symbols or other content on the particular RO or the meta-data associated with the particular RO in order to associate the particular RO within the existing cluster. For instance, the processor 204 may determine that the particular RO includes content related to the particular vehicle symptom and may thus associate the particular RO with the existing cluster due to the existing cluster being arranged to contain ROs that correspond to the particular vehicle symptom. Other examples are also possible.

In some cases, the existing cluster being arranged to contain ROs that correspond to the particular vehicle symptoms may specifically involve arranging the existing cluster to contain ROs that correspond to the particular vehicle symptom without also corresponding to a specific vehicle component (or to a corrective action being done to the specific vehicle component in order to resolve the particular vehicle symptom). ROs contained within such a cluster may thus contain content related to the particular vehicle symptom but may not contain content that is representative of a specific vehicle component. Rather, as further discussed in detail below, an RO contained within such a cluster may perhaps contain content that is related to a non-specific vehicle component. In such cases, the processor 204 may determine that the particular RO corresponds to the existing cluster by determining that the particular RO contains content related to the particular vehicle symptom but does not contain content that is representative of a specific vehicle component.

Table 6 shows data identifying three clusters identified with ID 26 through 28, inclusive. The cluster size indicates how many RO have been associated with the respective cluster. The cluster size can be modified as or after additional RO are added to RO 214 or after an RO is transferred from one cluster to a different cluster. Table 6 shows examples of DTC, Action, and component attributes associated with each respective RO cluster. Of course, as noted above in relation to Table 1, Table 6 can be modified to include a separate column for other attributes as well. The other attributes can identify RO attributes such as, but not limited to, a customer complaint, a date, or a labor operation code (LOC).

TABLE 6

| Cluster ID | Cluster Size | DTC | Action | Component(s) |
|---|---|---|---|---|
| 26 | 1,254 | P0101 | — | — |
| 27 | 1,516 | P0503, P0504 | — | — |
| 28 | 984 | P0906 | — | — |

As shown, these example clusters are each arranged to contain ROs that correspond to at least one particular vehicle symptom without also corresponding to an action and/or to a component attributes. For instance, the cluster having a cluster ID of 26 is associated with a single vehicle symptom taking the form of DTC P0101. Whereas, the cluster having a cluster ID of 27 is associated with two vehicle symptoms that respectively take the form of DTC P0503 and DTC P0504. Of course, an example cluster could be associated with two or more vehicle symptoms. In either case, the above-mentioned existing cluster could be one of the example clusters shown in Table 6, among other possible clusters.

With this example arrangement, the above-mentioned particular RO may be one of the ROs in one of the clusters shown in Table 6. For instance, the particular RO may be one of the ROs associated with RO cluster ID 26. To illustrate, Table 7 next shows an example of data included on five of the 1,254 ROs associated with the RO cluster ID 26 shown in Table 6. The RO data in Table 7 includes an RO identifier that can, for example, be assigned by a VRT or VRD system 102. The RO data in Table 7 also includes year/make/model/engine attributes associated with each RO. Of course, as noted above in relation to Table 2, Table 7 can be modified to include a separate column to include other attributes, such as sub-model attributes for vehicles that are associated with a sub-model attribute.

TABLE 7

| RO ID | Year | Make | Model | Engine |
|---|---|---|---|---|
| 6478 | 2001 | Infiniti | I30 | 3.0 L V6, VIN (C) |
| 2224 | 1999 | Ford | Cutaway E350 | 6.8 L, V10, VIN (S) |
| 4390 | 2005 | Ford | Pickup F250 Super Duty | 5.4 L, V8 VIN (5) |
| 1273 | 2001 | Hyundai | XG300 | 3.0 L V6, VIN (D) |
| 3815 | 2001 | Nissan | Maxima GLE | 3.0 L V6, VIN (C) |

Further, as noted, the particular RO at issue may include at least first and second RO portions. In some cases, the first RO portion may be different from the second RO portion. In other cases, the first RO portion may be the same as the second RO portion. In either case, an RO portion may generally refer to an area that is found within an RO and that contains a set of computer-readable data of a certain classification or category.

By way of example, an RO portion may be a service provider identifier 402 portion, a date of service identifier 404 portion, a customer indicator 406 portion, a vehicle information 408 portion, a vehicle service request portion (e.g., vehicle service requests 410, 412, and 414), a parts information 416 portion, a service procedure information portion (e.g., service procedure information 418, 420, and 422), and a vehicle-usage indicator 430 portion. In other examples, an RO portion may be a VIN 432 found within vehicle information 408, or a distinct RO section (e.g., section 424) found within service procedure information (e.g., service procedure information 418). In yet other examples, an RO portion may be an LOC, a DTC, a vehicle symptom, a labor line found within a distinct RO section and specifying a corrective action taken to resolve a vehicle symptom, or a parts line found within parts information and specifying information about a certain part (e.g. FIG. 4 showing a part line of an MAF sensor that has an associated part number 6012980 and is priced at $89.99). Other examples are possible as well.

At block 604, method 600 involves determining, by the at least one processor, that the first RO portion includes first data representative of a non-specific vehicle component.

According to various implementations, a specific vehicle component may be represented by one of the terms (e.g., words or phrases) found within a certain taxonomy group of the taxonomy term database 216. This certain taxonomy group may essentially provide for a vehicle component database 238 including a plurality of computer-readable vehicle component terms. As such, if the processor 204 determines that a given text string (e.g., found in an RO portion) matches a distinct vehicle component term from among the plurality of vehicle component terms found in the vehicle component database 238, then the processor 204 may responsively determine that this given text string is representative of a specific vehicle component.

By way of example, the processor 204 may evaluate service procedure information 422 and, while doing so, may determine that service procedure information 422 of an RO includes a text string of “coolant sensor”. The processor 204 may then refer to the vehicle component database 238 to determine whether this text string matches just one of the vehicle component terms found in the vehicle component database 238, substantially matches two or more vehicle component terms found in the vehicle component database 238, or does not match any of the vehicle component terms found in the vehicle component database 238. In this example, the processor 204 may make a determination that the text string at issue matches just one of the vehicle component terms found in the vehicle component database 238, such as by determining that the sequence of letters/number/symbols/gaps within the text string (e.g., coolant sensor) is exactly the same as a sequence of letters/number/symbols/gaps within a distinct vehicle component term, for instance. This determination may then serve as an indication to the processor 204 that the text string of “coolant sensor” is representative of a specific vehicle component.

As such, if an RO contains content related to the particular vehicle symptom as well as content that is related to a specific vehicle component, then this RO may be associated with a cluster that is arranged to contain ROs corresponding to the particular vehicle symptom and to the specific vehicle component. Nonetheless, such content related to a specific vehicle component may not have been found within the particular RO at issue. As a result, the particular RO may be initially associated with the existing cluster that is arranged to contain ROs corresponding to the particular vehicle symptom but not to a specific vehicle component.

In some cases, however, the particular RO may contain content that is related to a non-specific vehicle component, which may ultimately be used to determine a specific vehicle component as further discussed below. According to an example implementation, the processor 204 may thus evaluate the particular RO to determine whether the particular RO includes data representative of a non-specific vehicle component. This non-specific vehicle component may be represented by a term (e.g., word or phrase) found within several vehicle component terms of the vehicle component database 238. As a result, ambiguity may generally arise as to which of these several vehicle component terms is the actual vehicle component being referred to in the particular RO, thereby resulting in issues such as incorrect association with the existing cluster and/or a repair technician incorrectly interpreting the particular RO, among other possible issues.

More specifically, the processor 204 may determine that a given text string is found within the above-mentioned first RO portion and may determine that the given text string substantially matches two or more vehicle component terms from the vehicle component database 238. In particular, this may involve determining that the given text string substantially matches at least a portion of each of these two or more vehicle component terms. As such, if the processor 204 determines that a given text string (e.g., found in the first RO portion) substantially matches two or more vehicle component terms from among the plurality of vehicle component terms found in the vehicle component database 238, then the processor 204 may responsively determine that this given text string is representative of a non-specific vehicle component.

By way of example, the processor 204 may evaluate parts information 416 and, while doing so, may determine that a parts line of parts information 416 includes a text string of “sensor”. The processor 204 may then refer to the vehicle component database 238 to determine whether this text string matches just one of the vehicle component terms found in the vehicle component database 238, substantially matches two or more vehicle component term found in the vehicle component database 238, or does not match any of the vehicle component terms found in the vehicle component database 238. In this example, the processor 204 may make a determination that the text string substantially matches two or more vehicle component term found in the vehicle component database 238. For instance, the processor 204 may determine the vehicle component database 238 includes two hundred vehicle component terms each including the text string of "sensor". Examples of such vehicle component terms may include (without limitation): MAF sensor, coolant sensor, temperature sensor, light sensor, oxygen sensor, pressure sensor, and fuel sensor. As such, when the processor 204 makes this determination, then this determination may then serve as an indication to the processor 204 that the text string of "sensor" is representative of a non-specific vehicle component. Other examples are possible as well.

At block 606, method 600 involves, in response to determining that the first RO portion includes the first data, the at least one processor determining that the second RO portion includes second data that the at least one processor can use to determine a specific vehicle component associated with the particular RO. And at block 608, method 600 involves, in response to determining that the second RO portion includes the second data, the at least one processor determining the specific vehicle component based on the first and second data.

According to an example implementation, once the processor 204 determines that the first RO portion includes first data representative of a non-specific vehicle component, the processor 204 may further evaluate the particular RO to determine whether the particular RO includes any second data that the processor 204 can use as a basis to determine a specific vehicle component, so as to ultimately eliminate any ambiguity arising from the non-specific vehicle component. In doing so, the processor 204 may evaluate second RO portion(s) of the particular RO. In particular, these second RO portion(s) may be one or more RO portions of the particular RO, such as a parts line and/or a labor line for instance. And in some cases, at least one of these one or more RO portion could be the same as the first RO portion discussed above.

In this example implementation, the processor 204 may carry out any of several sets of operations in order to determine whether the particular RO includes such second data and to then use this second data in combination with the first data to determine the specific vehicle component. When taking steps to determine the specific vehicle component, the processor 204 may carry out one or more of these sets of operations and may also carry out these sets of operations in any order. Moreover, once the processor 204 carries out a set of operations that results in determination of a specific vehicle component, the processor 204 may then responsively stop carrying out any further sets of operations. These sets of operations will now be described in more detail.

In one case, the processor 204 may determine whether a particular DTC identifier is associated with the particular RO. For example, the processor 204 may do so by determining the existing cluster associated with the particular RO, such as by determining the cluster ID associated with the particular RO. And the processor 204 may then determine whether the existing cluster is arranged to contain ROs that correspond to a particular DTC identifier. If the processor 204 determines that the existing cluster is arranged to contain ROs that correspond to a particular DTC identifier, then the processor 204 may responsively determine that the particular DTC identifier is associated with the particular RO. Alternatively, the processor 204 may refer to a second RO portion and may determine that the second RO portion includes a particular DTC identifier, such as by determining that a text string found within the second RO portion matches a DTC identifier from a taxonomy group that includes a plurality of DTC identifiers, for instance.

Once the processor 204 determines a particular DTC identifier is associated with the particular RO, the processor 204 may determine a specific vehicle component based on the non-specific vehicle component and the determined particular DTC identifier. To do so, the processor 204 may statistically infer the specific vehicle component based on the non-specific vehicle component and the determined particular DTC identifier. In particular, the processor 204 may refer to the data storage device 210 that contains a plurality of ROs 214. From among this plurality of ROs 214, the processor 204 may recognize ROs that are each associated with the particular DTC identifier, such as ROs that include the particular DTC identifier in the repair order text for instance. The processor 204 may then determine that a threshold percentage (e.g., established via manual engineering input and/or incorporated as part of CRPI 218) of the recognized ROs include repair data referring to the particular DTC identifier as well as to a given vehicle component that is related to the non-specific vehicle component. This given vehicle component may be one of the above-mentioned vehicle component terms for which at least a portion of the term matches the text string of the non-specific vehicle component. Once the processor 204 determines that a threshold percentage of the recognized ROs include such repair data, the processor 204 may responsively determine that the given vehicle component is the specific vehicle component.

By way of example, the particular RO may include a non-specific vehicle component of "sensor" and may be associated with a DTC of P0135. In this example, the processor 204 may determine a percentage of the ROs that each includes repair data referring to P0135 as well as to a vehicle component term having a portion which includes the text string of "sensor". For instance, the processor 204 may determine that eighty percent of ROs include repair data referring to P0135 as well as to an oxygen sensor. Then, the processor 204 may determine that this percentage exceeds a threshold percentage of seventy percent and may thus responsively determine that the specific vehicle component is an oxygen sensor. Other examples are possible.

In another aspect, the processor 204 may also use vehicle attributes as an additional basis for determining the specific vehicle component. In particular, the processor 204 may determine that the particular RO includes specific data that refers to a particular vehicle having particular vehicle attributes. The processor 204 may do so in various ways. In one example, the processor 204 could refer to meta-data associated with the particular RO in order to identify the particular vehicle as well as the particular vehicle attributes. In another example, the processor 204 may refer to vehicle information 408, such by referring to the vehicle identification number (VIN) 432 associated with the particular vehicle and/or to the description of the particular vehicle. With this information, the processor 204 could then refer to vehicle-ID search terms 232 to determine one or more vehicle attributes associated with the particular vehicle. These vehicle attributes may include, but are not limited to: (i) a vehicle year attribute, (ii) a vehicle make attribute, (iii) a vehicle model attribute, (iv) a vehicle engine attribute, (v) a vehicle system attribute, (vi) a vehicle-year-make-model attribute, (vii) a vehicle-year-make-model-submodel attribute, (viii) a vehicle engine code, (ix) a vehicle drive type, and (x) a vehicle fuel system type.

Once processor 204 determines that the particular RO includes specific data that refers to a particular vehicle having particular vehicle attributes, the processor 204 may determine that the particular vehicle is related to a set of one or more vehicles. The one or more vehicles of the set may all share one or more of the same vehicle attributes. Hence, the particular vehicle may be related to the set due to having the same or similar vehicle attributes as those of one or more vehicles of the set. Moreover, the processor 204 may determine that the particular vehicle is related to the set based on an indication (e.g., stored within data storage device 210) that the particular vehicle is related to the set. For example, the processor 204 could do so by referring to vehicle leverage data 224 including computer-readable data that identifies different vehicle models built on a common vehicle platform. In another example, the processor 204 could do so by referring to parts leverage data 226 including data that identifies different vehicle models that use a common part produced by one or more part(s) manufacturer. Other examples are also possible.

As such, the processor 204 may identify ROs, from among the plurality of ROs 214, that include further data referring to at least one vehicle from the set. In particular, an RO could be associated with at least one vehicle from the set due to, for instance, having vehicle information 408 that refers to at least one such vehicle from the set. The processor 204 may identify such ROs in various ways. For example, the processor 204 could refer to search terms 230 so as to identify one or more RO IDs associated with a given vehicle from the set. The processor 204 could do so for some of or all of the vehicles from the set and could thus identify a plurality of RO IDs associated with ROs that each have data referring to at least one vehicle from the set.

From among these identified ROs, the processer 204 may then recognize ROs that are each associated with the particular DTC identifier and may then take steps as discussed above in this case in order to determine the specific vehicle component. In particular, the processor 204 may then determine that a threshold percentage of the recognized ROs include repair data referring to the particular DTC identifier as well as to a given vehicle component that is related to the non-specific vehicle component, and the processor 204 may then responsively determine that the given vehicle component is the specific vehicle component. In this manner, the processor 204 may carry out the set of operations for this case only in the context of ROs that list vehicles having similar vehicle attributes to those of the particular vehicle at issue, thereby statistically increasing the probability of correctly inferring the specific vehicle component.

In another case, the processor 204 may determine whether a particular vehicle symptom (e.g., other than a DTC identifier) is associated with the particular RO. For example, the processor 204 may do so by determining the existing cluster associated with the particular RO, such as by determining the cluster ID associated with the particular RO. And the processor 204 may then determine whether the existing cluster is arranged to contain ROs that correspond to a particular vehicle symptom. If the processor 204 determines that the existing cluster is arranged to contain ROs that correspond to a particular vehicle symptom, then the processor 204 may responsively determine that the particular vehicle symptom is associated with the particular RO. Alternatively, the processor 204 may refer to a second RO portion and may determine that the second RO portion includes symptom data representative of the particular vehicle symptom, such as by determining that a text string found within the second RO portion matches a vehicle symptom from a taxonomy group that includes a plurality of vehicle symptoms, for instance.

Once the processor 204 determines a particular vehicle symptom is associated with the particular RO, the processor 204 may use this particular vehicle symptom as a basis for determining the specific vehicle component. As an initial matter, the processor 204 may determine that that the particular vehicle symptom is associated with a particular vehicle system, such as a particular vehicle symptom having one or more vehicle components that may exhibit this particular vehicle symptom. For example, the processor 204 could do so by referring to meta-data associated with the particular vehicle symptom in order to identify this particular vehicle system. And once the processor 204 determines that that the particular vehicle symptom is associated with a particular vehicle system, the processor 204 may determine the specific vehicle component based on the non-specific vehicle component and the particular vehicle system.

More specifically, the non-specific vehicle component may correspond to a first text string that is representative of the non-specific vehicle component while the particular vehicle system may correspond to a second text string that is representative of the particular vehicle system. With this arrangement, the processor 204 may generate a particular text string that is a combination of at least a portion of the first text string and at least a portion of the second text string. Then, the processor 204 may refer to the vehicle component database 238 to determine if the generated text string matches a distinct vehicle component term from among the plurality of vehicle component terms found in the vehicle component database 238. If the generated text string matches a distinct vehicle component term, then the processor 204 may determine that the generated text string is representative of the specific vehicle component. Whereas, if the generated text string does not match a distinct vehicle component term, then the processor 204 may generate another text string, such as by using different respective portions of the first and second text strings. And the processor 204 may then again repeat this set of operations for the newly generated text string. In this manner, the processor 204 may continue generating text strings until the processor 204 generates a text string that matches a distinct vehicle component term.

By way of example, the particular RO may include a non-specific vehicle component of "clutch" and may be associated with a particular vehicle symptom of "A/C inoperative" (with A/C referring to air conditioning). In this example, the processor 204 may refer to meta-data associated with "A/C inoperative" and may make a determination that "A/C inoperative" is associated with an "A/C system". Once the processor 204 makes this determination, the processor 204 may then generate a particular text string as discussed above. For instance, the processor 204 may use a portion of the term "A/C system", such as the portion of "A/C". Also, the processor 204 may use the entirety of the term "clutch". Then, the processor 204 may combine the portion "A/C" with the term "clutch" to result in the text string of "A/C clutch". With this approach, the processor 204 may then determine that "A/C clutch" matches a distinct vehicle component term in the vehicle component database 238, thereby determining that "A/C clutch" is the specific vehicle component.

In yet another case, the processor 204 may determine whether the particular RO (e.g., the second portion of the particular RO) includes replacement data specifying a replaced vehicle component. For instance, such replacement data could be found in a labor line of the particular RO, among other possibilities. To determine whether the particular RO includes replacement data, the processor 204 may determine whether the particular RO includes replacement text that matches one of a plurality of terms found in a taxonomy group of terms related to replacement, such as terms including (without limitation): “replace”, “replaced”, “replacing”, “replacement”, “R/R” (R/R stands for “remove and replace” or “remove and repair”), or the like. If the processor 204 determines that the particular RO includes replacement text that matches one of these plurality of terms, the processor 204 may evaluate a term that follows (and/or a term that precedes) the replacement text in order to determine whether the following term matches a distinct vehicle component term from among the plurality of vehicle component terms found in the vehicle component database 238. As such, if the processor 204 determines that the following term matches a distinct vehicle component term, the processor 204 may then determine that the following term refers to a replaced vehicle component.

In this case, the processor 204 may compare the replaced vehicle component to the non-specific vehicle component in order to determine whether the replaced vehicle component is the specific vehicle component. In particular, the non-specific vehicle component may correspond to a first text string that is representative of the non-specific vehicle component while the replaced vehicle component may correspond to a second text string that is representative of the replaced vehicle component. With this arrangement, the processor 204 may determine whether the first text string matches at least a portion of the second text string. And if the processor 204 determines that the first text string matches at least a portion of the second text string, then the processor 204 may responsively determine that the replaced vehicle component is indeed the specific vehicle component.

By way of example, the particular RO may include a non-specific vehicle component of “wiring harness” and may be associated with a DTC of P0335. In this example, the processor 204 may determine that a distinct RO section has a labor line including the replacement text of “replaced”, which matches one of the plurality of terms related to replacement. Also, the processor 204 may then determine that the term “CKP wiring harness” follows the replacement text of “replaced” and that this term matches a distinct vehicle component term. Subsequently, the processor 204 may make a determination that the text string of “wiring harness” matches a portion of the text string of “CKP wiring harness”. And in response to making this determination, the processor 204 may determine that the specific vehicle component is a CKP wiring harness. Other examples are possible as well.

In some cases, the processor 204 may determine that the particular RO (e.g., the first portion of the particular RO) includes replacement data specifying a replaced vehicle component, such as by using the techniques discussed above. For instance, this replacement data could be found in any RO text field of the particular RO. Regardless, when determining that the particular RO include replacement data, the processor 204 may determine whether the replaced vehicle component matches a distinct vehicle component term from the plurality of vehicle component terms found in the vehicle component database 238 or whether the replacement data specifies replacement of a non-specific vehicle component. If the processor 204 determines that the replaced vehicle component matches a distinct vehicle component term, then the processor 204 may responsively determine that the distinct vehicle component term is representative of the specific vehicle component. In contrast, if the processor 204 determines that the replacement data actually specifies replacement of a non-specific vehicle component, then the processor 204 may responsively use any set of operations discussed herein to determine the specific vehicle component.

By way of example, the processor 204 may determine that the particular RO is associated with a DTC of P0101 that there is no vehicle components listed on any parts line of the particular RO. However, the processor 204 may determine that a distinct RO section includes the replacement text of “replaced”, which matches one of the plurality of terms related to replacement. Also, the processor 204 may then determine that the term “sensor” follows the replacement text of “replaced” and that this term does not match a distinct vehicle component term, thereby indicating that the term is representative of a non-specific vehicle component. Responsively, the processor 204 may use at least one set of operations discussed herein in order to determine a specific vehicle component and thus eliminate ambiguity associated with the term “sensor”. For instance, the processor 204 may determine that the particular RO is associated with a DTC of P0101. In this instance, the processor 204 may determine that ninety percent of ROs in the database include repair data referring to P0101 as well as to a Mass Airflow sensor. Then, the processor 204 may determine that this percentage exceeds a threshold percentage of seventy percent and may thus responsively determine that the replaced specific vehicle component is a Mass Airflow sensor. Other examples are possible.

In yet another case, the processor 204 may determine whether the particular RO (e.g., the second portion of the particular RO) includes identification data specifying a particular vehicle part number associated with the non-specific vehicle component. For instance, the processor 204 may refer to a parts line that includes the non-specific vehicle component and may determine whether this parts line includes a particular vehicle part number. If the parts line includes the particular vehicle part number, the processor 204 may refer to the data storage device 210 in order to determine the specific vehicle component.

In particular, the data storage device 210 may contain a part number database 240 that includes mapping data that maps certain vehicle part numbers to certain respective part number descriptions. With this arrangement, the processor 204 may refer to the data storage device 210 to determine whether the particular vehicle part number matches one of the vehicle part numbers found in the part number database 240. If the processor 204 determines that the particular vehicle part number indeed matches one of the vehicle part numbers, the processor 204 may use the mapping data to determine the respective part number description of the particular vehicle part number. And this respective part number description of the particular vehicle part number may include the specific vehicle component. In this manner, the processor 204 may determine the specific vehicle component using a particular vehicle part number found in a parts line associated with the non-specific vehicle component.

By way of example, the particular RO may include a non-specific vehicle component of “sensor” on a given parts line. In this example, the processor 204 may determine that the given parts line also includes a particular vehicle part number of “37980-RLF-003”. Accordingly, the processor 204 may refer to the data storage device 210 and may determine that the particular vehicle part number of “37980-

RLF-003" matches one of the vehicle part numbers found in the part number database 240. Responsively, the processor 204 may then use the mapping data to determine the respective part number description for the particular vehicle part number of "37980-RLF-003". And the processor 204 may then determine that this respective part number description includes reference to a "Mass Air Flow sensor", which matches one of the vehicle component terms found in the vehicle component database 238. As such, the processor 204 may determine that the specific vehicle component is a Mass Air Flow sensor. Other cases and examples are possible as well.

At block 610, method 600 involves, in response to determining the specific vehicle component, the at least one processor adding the particular RO to a different cluster of ROs, where the different cluster is arranged to contain ROs that correspond to the particular vehicle symptom and to the specific vehicle component.

In an example implementation, the processor 204 may determine the specific vehicle component and may then add this particular RO to a different cluster of ROs. This different cluster may be arranged to contain ROs that have data corresponding to the above-mentioned particular vehicle symptom as well as data corresponding to the determined specific vehicle component. For instance, a different cluster may contain ROs that correspond to a DTC of P0135 and to a determined specific vehicle component of "Oxygen Sensor". In another instance, a different cluster may contain ROs that correspond to a particular vehicle symptom of "A/C inoperative" and to a determined specific vehicle component of "A/C clutch". In yet another instance, a different cluster may contain ROs that correspond to a DTC of P0335 and to a determined specific vehicle component of "CKP wiring harness". In yet another instance, a different cluster may contain ROs that correspond to a DTC of P0101 and to a determined specific vehicle component of "Mass Airflow sensor". Of course, the different cluster could also involve other vehicle attributes and may thus be arranged to contain ROs that correspond to the particular vehicle symptom, to the determined specific vehicle component, and to these other vehicle attributes.

In one example situation, as noted above, the processor 204 may determine that the particular RO is a new RO that is received by the processor 204 before the particular RO has been added to any of the existing cluster and the different cluster. In this situation, the processor 204 may add the particular RO to both the existing cluster and to the different cluster. In another case, the processor 204 may add the particular RO to the different cluster without also adding the particular RO to the existing cluster. Other cases are also possible.

In another example situation, as noted above, the processor 204 may determine that the particular RO is already contained in the existing cluster. In this situation, the processor 204 may add the particular RO to the different cluster and may also keep the particular RO in the existing cluster such that the particular RO is then contained in both the existing cluster and the different cluster. In another case, the processor 204 may add the particular RO to the different cluster and may also remove the particular RO from the existing cluster such that the particular RO is then contained in the different cluster and is no longer contained in the existing cluster. Other cases are also possible.

Figure 7A:
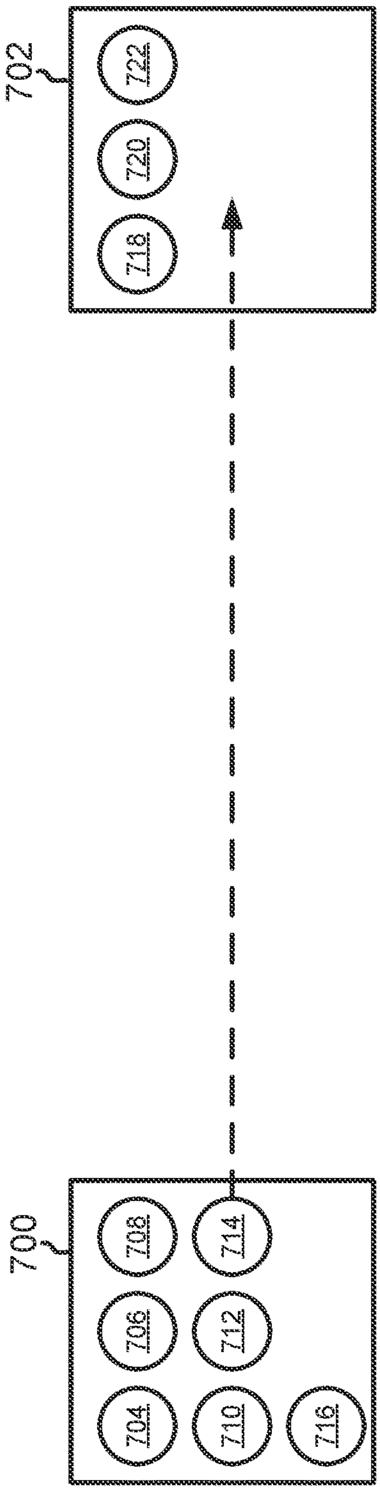
FIGS. 7A to 7B illustrate example movement of an RO between clusters in accordance with one or more examples embodiments.
Figure 7B:
Figure 8A:
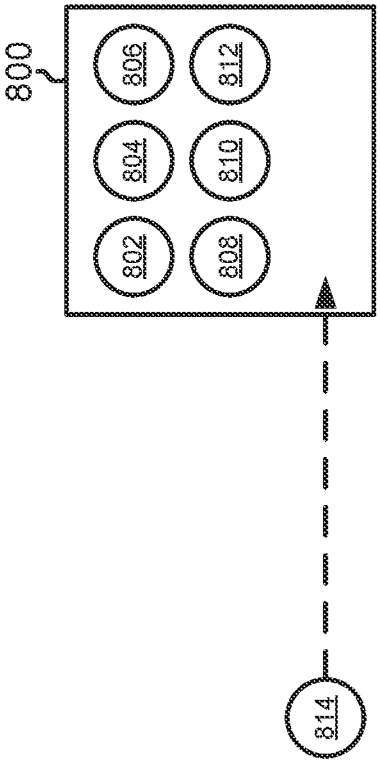
FIGS. 8A to 8B illustrate example addition of a new RO to a cluster in accordance with one or more examples embodiments.
Figure 8B:
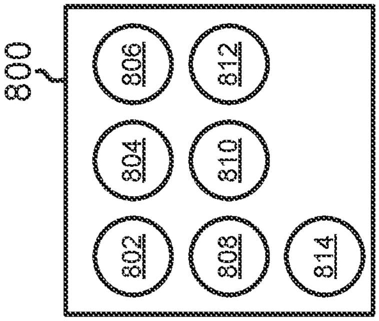

FIGS. 7A to 7B illustrate example of movement of an RO between clusters. In particular, FIG. 7A shows an example cluster 700 containing ROs 704 to 716 as well as example cluster 702 containing ROs 718 to 722. As illustrated, RO 714 is being moved from cluster 700 to cluster 702. Then, after the RO 704 has been moved, FIG. 7A shows the cluster 702 as containing RO 714 and the cluster 700 as no longer containing RO 714. Further, FIGS. 8A to 8B illustrate example of addition of an RO to a cluster. In particular, FIG. 8A shows an example cluster 800 containing ROs 802 to 812. As illustrated, new RO 814 is being added to the cluster 800. Then, after the new RO has been added to the cluster 800, FIG. 8B shows the cluster 800 as containing RO 814. Note that clusters 700, 702, and 800 may be stored in clusters of data storage device 210 (e.g., within clusters database 236 further discussed below). Other illustrations are also possible.

In an example arrangement, the processor 204 may use various techniques to add the particular RO to a cluster, to remove the particular RO from a cluster, to move the particular RO between clusters, and/or to keep the particular RO in a cluster. In one case, to add the particular RO to a cluster, the processor 204 may generate meta-data to associate the particular RO with an appropriate cluster ID and may then store this generated meta-data (e.g., within meta-data 222 along with a tag or reference to the particular RO). In another case, to remove the particular RO from a cluster, the processor 204 may (i) revise meta-data that associates the particular RO with the cluster ID so as to indicate that the particular RO is no longer associated with this cluster ID and may then (ii) store this revised meta-data. Alternatively, to remove the particular RO from a cluster, the processor 204 may remove meta-data that associates the particular RO with the cluster ID such as by removing this meta-data from data storage 210.

In yet another case, to move the particular RO between clusters, the processor 204 may revise meta-data that associates the particular RO with a first cluster ID so as to indicate within the meta-data that the particular RO is no longer associated with this first cluster ID and is rather associated with a second cluster ID. Alternatively, to move the particular RO between clusters, the processor 204 may generate meta-data to associate the particular RO with a first cluster ID (and may then store this generated meta-data) while also removing or revising meta-data that associates the particular RO with a second cluster ID in the manner discussed above. In yet another case, to keep the particular RO in a cluster, the processor 204 may simply maintain any meta-data that associates the particular RO with this cluster. Other cases are also possible.

In an example implementation, the processor 204 could refer to the data storage 210 to determine whether or not the data storage 210 contains the different cluster. This may specifically involve the processor 204 referring to a clusters database 236 within data storage 210 that includes clusters of ROs. In particular, the clusters database 236 may include all existing IDs associated with clusters of ROs, cluster attributes associated with certain clusters of ROs, and/or meta-data associating certain ROs with certain clusters of ROs (additionally or alternatively, this meta-data could be included within meta-data 222 as discussed above), among others. With this arrangement, the processor 204 may determine whether or not the data storage 210 contains a cluster ID for a particular cluster that is arranged to contain ROs that correspond to the particular vehicle symptom and to the determined specific vehicle component. If the processor 204 determines that the data storage 210 contains the different cluster, the processor 204 may then add the particular RO to this different cluster as discussed above. Whereas, if the processor 204 determines that the data storage 210 does not contain the different cluster, the processor 204 may generate this different cluster and may store this generated different cluster in the data storage 210. Once the processor 204 generated this different cluster, the processor 204 may then add the particular RO to this different cluster as discussed above.

The processor 204 may generate the different cluster in one of various ways. For instance, the processor 204 may generate a cluster ID for a combination of vehicle attributes (e.g., meta-data of the attributes) that define the cluster. Such attributes may include particular DTC(s), particular symptom(s), particular component(s), and/or particular labor operation(s) (e.g., particular LOC(s)), among others. By way of example, the processor 204 may assign a particular cluster ID to a combination of "P0101" and "Mass Airflow Sensor" attributes and may thus associate ROs containing data representative of such attributes with this particular cluster ID. In this manner, different combinations of vehicle attributes may be assigned different cluster IDs. Other examples are also possible.

IV. Additional Aspects

In an example implementation, the processor 204 may carry out the various sets of operations discussed above but may still not be able to determine the specific vehicle component. This may be due to the processor 204 determining that the particular RO does not include certain information needed to carry out a certain set of operations, or may be due to other reasons. Regardless, in such situations the processor 204 may generate a report for human review. The purpose of the report is to provide valuable information that could help to manually determine the specific vehicle component and to then manually categorize the particular RO into an appropriate cluster. Hence, the report could indicate that the processor 204 was unable to determine the specific vehicle component and that thus ambiguity still exists with regards to the non-specific vehicle component.

Additionally or alternatively, the report could provide other information that could help appropriately categorize the particular RO. For example, the processor 204 could identify one or more other ROs within ROs 214 that have similarities to the particular RO at issue. These similarities may involve the other ROs having data indicating the same (or similar) vehicle symptoms, the same (or similar) corrective actions, and/or the same (or similar) non-specific vehicle component. Upon identifying such ROs, the processor 204 could generate the report to list such ROs and/or perhaps to list valuable information included in these ROs.

To illustrate, refer again to FIG. 1 showing that the VRD system 102 may output a report 124. In particular, this report 124 could be displayed as part of a graphical user interface (GUI) on a display of the VRD system. In another case, the VRD system 102 could transmit the report 124 to one or more of the VRTs 106-120 (and/or to other devices) such that a VRT could display this report 124. For instance, VRT 300 of FIG. 3 is shown to display a report 314 (e.g., could be the same as report 124) as part of the user interface 314. In yet another case, the VRD system 102 may store the report 124 in data storage 210 and/or cloud-based data storage so as to make the report 124 accessible for human review via a device (e.g., a VRT). Other cases are also possible.

V. Conclusion

Example embodiments have been described above. Those skilled in the art will understand that changes and modifications can be made to the described embodiments without departing from the true scope of the present invention, which is defined by the claims.

Additional embodiments, based on the features or functions described herein, can be embodied as a computer-readable medium storing program instructions, that when executed by a processor of a machine cause a set of functions to be performed, the set of functions comprising the features or functions of the aspects and embodiments described herein.

We claim:

1. A method comprising:

storing, within a non-transitory computer-readable memory, multiple computer-readable vehicle repair orders (ROs), a clusters database, a taxonomy terms database, a parts number database, and first meta-data that associates a particular computer-readable vehicle repair order (RO) with an existing cluster identifier, wherein:

the multiple ROs include the particular RO, the clusters database includes multiple clusters, each cluster of the multiple clusters corresponds to a respective cluster identifier and a respective set of RO attributes, a cluster of the multiple clusters contains the particular RO when the particular RO is associated with the respective cluster identifier of the cluster, the multiple clusters include an existing cluster of ROs and a different cluster of ROs, the existing cluster of ROs corresponds to the existing cluster identifier and an existing set of RO attributes, the existing set of RO attributes includes a particular vehicle symptom, the different cluster of ROs corresponds to a different cluster identifier and a different set of RO attributes, the different set of RO attributes specify the particular vehicle symptom and a specific vehicle component, the particular RO is associated with the existing cluster identifier and specifies the particular vehicle symptom, the taxonomy terms database contains data that identifies a plurality of first taxonomy terms each indicative of a respective vehicle component, and the parts number database contains data that identifies a mapping of specific vehicle part numbers to particular part number descriptions, based on the first meta-data that associates the particular RO with the existing cluster identifier, determining, by one or more processors, that the particular RO is contained in the existing cluster of ROs;

making a first determination, by the one or more processors, that the particular RO includes, within a first portion of the particular RO, a first text string representative of a non-specific vehicle component by determining that the first text string partially matches two or more taxonomy terms of the plurality of first taxonomy terms;

in response to making the first determination, the one or more processors making a second determination that the particular RO includes, within a second portion of the particular RO, a second text string indicative of a particular part number;

based on the second determination, the one or more processors making a third determination that includes inferring the non-specific vehicle component represented by the first text string is the specific vehicle component specified by the different set of RO attributes by: (i) determining, within the parts number database, a first particular part number description corresponding to the particular part number, and (ii) determining the first text string partially matches a portion of the first particular part number description, and in response to making the third determination, moving the particular RO from the existing cluster of ROs to the different cluster of ROs, wherein moving the particular RO is carried out by: (i) revising the first meta-data so that the first meta-data associates the particular RO with the different cluster identifier and no longer associates the particular RO with the existing cluster identifier, or (ii) generating second meta-data that associates the particular RO with the different cluster identifier and revising the first meta-data so that the first meta-data no longer associates the particular RO with the existing cluster identifier.

2. The method of claim 1, wherein:

the particular RO comprises a parts line and a remaining portion of the particular RO, and the first portion of the particular RO and the second portion of the particular RO are contained on the parts line.

3. The method of claim 2, wherein the parts line includes data indicative of a price corresponding to the non-specific vehicle component represented by the first text string.

4. The method of claim 1, wherein determining the first text string partially matches a portion of the first particular part number description includes determining the first text string includes a word that is identical to a word within the first particular part number description.

5. The method of claim 1, wherein the particular part number includes one or more numerals and one or more alphabet letters.

6. The method of claim 1, wherein the particular vehicle symptom includes a particular diagnostic trouble code (DTC) identifier.

7. The method of claim 1, wherein:

the non-transitory computer-readable memory has stored thereon an indication that the particular RO is associated with the existing cluster identifier, and moving the particular RO from the existing cluster of ROs to the different cluster of ROs comprises:

removing, from the non-transitory computer-readable memory, the indication that the particular RO is associated with the existing cluster identifier; and storing, at the non-transitory computer-readable memory, an indication that the particular RO is associated with a different cluster identifier, and the different cluster identifier is stored within the non-transitory computer-readable memory to identify the different cluster of ROs.

8. The method of claim 1, wherein:

the different cluster of ROs contains a particular quantity of ROs after the particular RO is moved to the different cluster of ROs, and the method further comprises:

receiving, by the one or more processors via a vehicle repair tool, a request that comprises at least one search term specifying at least the particular vehicle symptom;

making a further determination, by the one or more processors, that the different cluster of ROs is associated with the at least one search term and that the particular quantity of ROs contained in the different cluster of ROs exceeds a threshold quantity; and based on the further determination, the one or more processors responding to the request by causing a display device of the vehicle repair tool to display a repair-hint associated with the different cluster of ROs, and the repair-hint specifies at least that a particular repair of the specific vehicle component resolves the particular vehicle symptom.

9. The method of claim 1, wherein the one or more processors determines content of the particular RO for storing within the non-transitory computer-readable memory by executing an optical character recognition application while scanning the particular RO.

10. The method of claim 1, wherein:

inferring the non-specific vehicle component represented by the first text string is the specific vehicle component specified by the different set of RO attributes further includes statistically inferring the specific vehicle component, and statistically inferring the specific vehicle component includes determining, from among the multiple ROs, a set of ROs that include text indicative of the particular vehicle symptom and that a threshold percentage of the set of ROs include text indicative of the non-specific vehicle component.

11. A computing system comprising:

a non-transitory computer-readable memory containing multiple computer-readable vehicle repair orders (ROs), a clusters database, a taxonomy terms database, a parts number database, and first meta-data that associates a particular computer-readable vehicle repair order (RO) with an existing cluster identifier, wherein:

the multiple ROs include the particular RO, the clusters database includes multiple clusters, each cluster of the multiple clusters corresponds to a respective cluster identifier and a respective set of RO attributes, a cluster of the multiple clusters contains the particular RO when the particular RO is associated with the respective cluster identifier of the cluster, the multiple clusters include an existing cluster of ROs and a different cluster of ROs, the existing cluster of ROs corresponds to the existing cluster identifier and an existing set of RO attributes, the existing set of RO attributes includes a particular vehicle symptom, the different cluster of ROs corresponds to a different cluster identifier and a different set of RO attributes, the different set of RO attributes specify the particular vehicle symptom and a specific vehicle component, the particular RO is associated with the existing cluster identifier and specifies the particular vehicle symptom, and the taxonomy terms database contains data that identifies a plurality of first taxonomy terms each indicative of a respective vehicle component, and the parts number database contains data that identifies a mapping of specific vehicle part numbers to particular part number descriptions, one or more processors coupled to the non-transitory computer-readable memory and programmed to:

based on the first meta-data that associates the particular RO with the existing cluster identifier, determine that the particular RO is contained in the existing cluster of ROs, make a first determination that the particular RO includes, within a first portion of the particular RO, a first text string representative of a non-specific vehicle component by determining that the first text string partially matches two or more taxonomy terms of the plurality of first taxonomy terms;

in response to making the first determination, make a second determination that the particular RO includes, within a second portion of the particular RO, a second text string indicative of a particular part number;

based on the second determination, make a third determination that includes inferring the non-specific vehicle component represented by the first text string is the specific vehicle component specified by the different set of RO attributes by: (i) determining, within the parts number database, a first particular part number description corresponding to the particular part number, and (ii) determining the first text string partially matches a portion of the first particular part number description, and in response to making the third determination, move the particular RO from the existing cluster of ROs to the different cluster of ROs, wherein moving the particular RO is carried out by: (i) revising the first meta-data so that the first meta-data associates the particular RO with the different cluster identifier and no longer associates the particular RO with the existing cluster identifier, or (ii) generating second meta-data that associates the particular RO with the different cluster identifier and revising the first meta-data so that the first meta-data no longer associates the particular RO with the existing cluster identifier.

12. The computing system of claim 11, wherein:

the particular RO comprises a parts line and a remaining portion of the particular RO, and the first portion of the particular RO and the second portion of the particular RO are contained on the parts line.

13. The computing system of claim 12, wherein the parts line includes data indicative of a price corresponding to the non-specific vehicle component represented by the first text string.

14. The computing system of claim 11, wherein determining the first text string partially matches a portion of the first particular part number description includes determining the first text string includes a word that is identical to a word within the first particular part number description.

15. The computing system of claim 11, wherein the particular part number includes one or more numerals and one or more alphabet letters.

16. The computing system of claim 11, wherein the particular vehicle symptom includes a particular diagnostic trouble code (DTC) identifier.

17. The computing system of claim 11, wherein:

the non-transitory computer-readable memory has stored thereon an indication that the particular RO is associated with the existing cluster identifier, and the one or more processors being programmed to move the particular RO from the existing cluster of ROs to the different cluster of ROs comprises the one or more processors being programmed to:

remove the indication that the particular RO is associated with the existing cluster identifier; and store an indication that the particular RO is associated with a different cluster identifier, wherein the different cluster identifier is stored within the non-transitory computer-readable memory to identify the different cluster of ROs.

18. The computing system of claim 11, wherein:

the different cluster of ROs contains a particular quantity of ROs after the particular RO is moved to the different cluster of ROs, and the one or more processors are further programmed to:

receive, via a vehicle repair tool, a request that comprises at least one search term specifying at least the particular vehicle symptom;

make a further determination that the different cluster of ROs is associated with the at least one search term and that the particular quantity of ROs contained in the different cluster of ROs exceeds a threshold quantity; and based on the further determination, respond to the request by causing a display device of the vehicle repair tool to display a repair-hint associated with the different cluster of ROs, wherein the repair-hint specifies at least that a particular repair of the specific vehicle component resolves the particular vehicle symptom.

19. The computing system of claim 11, wherein:

inferring the non-specific vehicle component represented by the first text string is the specific vehicle component specified by the different set of RO attributes further includes statistically inferring the specific vehicle component, and statistically inferring the specific vehicle component includes determining, from among the multiple ROs, a set of ROs that include text indicative of the particular vehicle symptom and that a threshold percentage of the set of ROs include text indicative of the non-specific vehicle component.

20. A non-transitory computer-readable memory containing multiple computer-readable vehicle repair orders (ROs), a clusters database, a taxonomy terms database, a parts number database, and first meta-data that associates a particular computer-readable vehicle repair order (RO) with an existing cluster identifier, wherein:

the multiple ROs include the particular RO, the clusters database includes multiple clusters, each cluster of the multiple clusters corresponds to a respective cluster identifier and a respective set of RO attributes, a cluster of the multiple clusters contains the particular RO when the particular RO is associated with the respective cluster identifier of the cluster, the multiple clusters include an existing cluster of ROs and a different cluster of ROs, the existing cluster of ROs corresponds to the existing cluster identifier and an existing set of RO attributes, the existing set of RO attributes includes a particular vehicle symptom, the different cluster of ROs corresponds to a different cluster identifier and a different set of RO attributes, the different set of RO attributes specify the particular vehicle symptom and a specific vehicle component, the particular RO is associated with the existing cluster identifier and specifies the particular vehicle symptom, and the taxonomy terms database contains data that identifies a plurality of first taxonomy terms each indicative of a respective vehicle component, and the parts number database contains data that identifies a mapping of specific vehicle part numbers to particular part number descriptions, the non-transitory computer-readable memory further contains instructions executable by one or more processors to cause a computing system to perform functions comprising:

based on the first meta-data that associates the particular RO with the existing cluster identifier, determining that the particular RO is contained in the existing cluster of ROs;

making a first determination that the particular RO includes, within a first portion of the particular RO, a first text string representative of a non-specific vehicle component by determining that the first text string partially matches two or more taxonomy terms of the plurality of first taxonomy terms;

in response to making the first determination, making a second determination that the particular RO includes, within a second portion of the particular RO, a second text string indicative of a particular part number;

based on the second determination, making a third determination that includes inferring the non-specific vehicle component represented by the first text string is the specific vehicle component specified by the different set of RO attributes by: (i) determining, within the parts number database, a first particular part number description corresponding to the particular part number, and (ii) determining the first text string partially matches a portion of the first particular part number description, and in response to making the third determination, moving the particular RO from the existing cluster of ROs to the different cluster of ROs, wherein moving the particular RO is carried out by: (i) revising the first meta-data so that the first meta-data associates the particular RO with the different cluster identifier and no longer associates the particular RO with the existing cluster identifier, or (ii) generating second meta-data that associates the particular RO with the different cluster identifier and revising the first meta-data so that the first meta-data no longer associates the particular RO with the existing cluster identifier.

* * * * *